US012579217B2

(12) United States Patent
Abe

(10) Patent No.: US 12,579,217 B2
(45) Date of Patent: Mar. 17, 2026

(54) TRAINING DATA CREATION METHOD, MACHINE LEARNING METHOD, CONSUMABLE MANAGEMENT DEVICE, AND COMPUTER READABLE MEDIUM

(71) Applicant: Gigaphoton Inc., Tochigi (JP)

(72) Inventor: Kunihiko Abe, Oyama (JP)

(73) Assignee: Gigaphoton Inc., Tochigi (JP)

( * ) Notice: Subject to any disclaimer, the term of this patent is extended or adjusted under 35 U.S.C. 154(b) by 215 days.

(21) Appl. No.: 18/063,559

(22) Filed: Dec. 8, 2022

(65) Prior Publication Data

US 2023/0117651 A1 Apr. 20, 2023

Related U.S. Application Data

(63) Continuation of application No. PCT/JP2020/028095, filed on Jul. 20, 2020.

(51) Int. Cl.
| | |
|---|---|
| *G06F 18/214* | (2023.01) |
| *G01N 21/17* | (2006.01) |
| *G01N 21/39* | (2006.01) |

(52) U.S. Cl.
CPC ..... *G06F 18/2148* (2023.01); *G01N 21/1702* (2013.01); *G01N 21/39* (2013.01); *G01N 2021/1704* (2013.01)

(58) Field of Classification Search
CPC ....... G01N 2021/1704; G01N 21/1702; G01N 21/39; G06F 18/2148; G06N 20/00; H01S 3/00

(Continued)

(56) References Cited

U.S. PATENT DOCUMENTS

| 6,219,367 B1 | 4/2001 | Atsumi |
|---|---|---|
| 6,697,695 B1 | 2/2004 | Kurihara et al. |

(Continued)

FOREIGN PATENT DOCUMENTS

| JP | 2000-306813 A | 11/2000 |
|---|---|---|
| JP | 2007-311109 A | 11/2007 |

(Continued)

OTHER PUBLICATIONS

An Office Action; mailed by the China National Intellectual Property Administration of the People's Republic of China on Sep. 14, 2024, which corresponds to Chinese Patent Application No. 202080101657.0 and is related to U.S. Appl. No. 18/063,559.

(Continued)

*Primary Examiner* — Sunghee Y Gray
(74) *Attorney, Agent, or Firm* — Studebaker Brackett PLLC

(57) ABSTRACT

A training data creation method according to an aspect of the present disclosure is used for machine learning of a learning model for predicting lifetime of a consumable of a laser device. The method includes acquiring first lifetime-related information including data of at least one lifetime-related parameter of the consumable recorded in association with each of numbers of oscillation pulses during a period from start of use to replacement of the consumable, determining a first deterioration degree of the consumable based on the number of oscillation pulses, determining a second deterioration degree of the consumable based on the at least one lifetime-related parameter, determining a third deterioration degree of the consumable based on the first deterioration degree and the second deterioration degree, and creating training data in which the first lifetime-related information and the third deterioration degree are associated with each other.

19 Claims, 31 Drawing Sheets

(58) Field of Classification Search
USPC ......................................................... 356/437
See application file for complete search history.

(56) References Cited

U.S. PATENT DOCUMENTS

| | | | |
|---|---|---|---|
| 2004/0022293 A1 | 2/2004 | Rule et al. | |
| 2015/0139258 A1 | 5/2015 | Tsushima et al. | |
| 2017/0262772 A1* | 9/2017 | Takigawa ............ | H01S 5/02423 |
| 2018/0246494 A1 | 8/2018 | Nakahama | |
| 2021/0333788 A1* | 10/2021 | Abe ....................... | G06N 20/00 |

FOREIGN PATENT DOCUMENTS

| | | | | |
|---|---|---|---|---|
| JP | 2012-253383 A | | 12/2012 | |
| JP | 2016-038710 A | | 3/2016 | |
| JP | 2020052821 A | * | 4/2020 | ............ B22C 9/082 |
| KR | 101406014 B1 | * | 6/2014 | |
| WO | 2014/017562 A1 | | 1/2014 | |

OTHER PUBLICATIONS

International Search Report issued in PCT/JP2020/028095; mailed Sep. 24, 2020.
International Preliminary Report On Patentability (Chapter I) and Written Opinion of the International Searching Authority issued in PCT/JP2020/028095; issued Jan. 24, 2023.

* cited by examiner

FIG. 1

NETWORK

NETWORK

VOLTAGE ↑

| | 1 | 2 | 3 | 4 | 5 | 6 | 7 | 8 | 9 | 10 |
|---|---|---|---|---|---|---|---|---|---|---|
| 10 | 9 | 10 | 10 | 10 | 10 | 10 | 10 | 10 | 10 | 10 |
| 9 | 8 | 8 | 9 | 9 | 10 | 10 | 10 | 10 | 10 | 10 |
| 8 | 7 | 7 | 8 | 8 | 9 | 9 | 10 | 10 | 10 | 10 |
| 7 | 6 | 6 | 6 | 7 | 8 | 8 | 9 | 10 | 10 | 10 |
| 6 | 5 | 5 | 6 | 7 | 7 | 8 | 8 | 9 | 10 | 10 |
| 5 | 4 | 4 | 5 | 5 | 5 | 7 | 8 | 9 | 10 | 10 |
| 4 | 3 | 3 | 4 | 4 | 5 | 6 | 7 | 8 | 9 | 10 |
| 3 | 1 | 2 | 3 | 4 | 5 | 6 | 7 | 8 | 9 | 10 |
| 2 | 1 | 1 | 2 | 3 | 4 | 5 | 6 | 7 | 9 | 10 |
| 1 | 1 | 1 | 1 | 2 | 3 | 4 | 5 | 7 | 8 | 9 |

→ NUMBER OF OSCILLATION PULSES OR GAS PRESSURE

VOLTAGE ↑

| | 1 | 2 | 3 | 4 | 5 | 6 | 7 | 8 | 9 | 10 |
|---|---|---|---|---|---|---|---|---|---|---|
| 10 | 6 | 6 | 9 | 10 | 10 | 10 | 10 | 10 | 10 | 10 |
| 9 | 5 | 5 | 8 | 8 | 9 | 9 | 10 | 10 | 10 | 10 |
| 8 | 4 | 4 | 7 | 7 | 8 | 8 | 9 | 10 | 10 | 10 |
| 7 | 3 | 3 | 6 | 7 | 8 | 8 | 9 | 10 | 10 | 10 |
| 6 | 2 | 2 | 5 | 7 | 7 | 8 | 9 | 10 | 10 | 10 |
| 5 | 1 | 2 | 5 | 6 | 7 | 8 | 9 | 10 | 10 | 10 |
| 4 | 1 | 2 | 5 | 6 | 7 | 8 | 9 | 10 | 10 | 10 |
| 3 | 1 | 1 | 5 | 6 | 7 | 8 | 9 | 10 | 10 | 10 |
| 2 | 1 | 1 | 5 | 6 | 7 | 8 | 9 | 10 | 10 | 10 |
| 1 | 1 | 1 | 5 | 6 | 7 | 8 | 9 | 10 | 10 | 10 |

→ NUMBER OF OSCILLATION PULSES OR GAS PRESSURE

DETERIORATION DEGREE $N_{ij}$ : NEURON
$X_{ij}$ : INTENSITY OF SIGNAL
$W_{ij}$ : WEIGHT

| DETERIORAT-ION DEGREE | PROBABILITY OF THE DETERIORATION DEGREE |
|---|---|
| Lv(1) | 0.0% |
| Lv(2) | 0.0% |
| Lv(3) | 3.2% |
| Lv(4) | 9.8% |
| Lv(5) | 13.7% |
| Lv(6) | 43.2% |
| Lv(7) | 67.8% |
| Lv(8) | 39.3% |
| Lv(9) | 17.3% |
| Lv(10) | 2.0% |

| MAJOR ITEM | SPECIFIC EXAMPLE | DESCRIPTION |
|---|---|---|
| ELECTRODE DETERIORATION PARAMETER | NUMBER OF TIMES OF DISCHARGE | NUMBER OF TIMES OF DISCHARGE BETWEEN ELECTRODES OF LASER CHAMBER (≈NUMBER OF OSCILLATION PULSES AFTER REPLACEMENT OF LASER CHAMBER) |
| | SPECTRAL LINE WIDTH | THERE IS POSITIVE CORRELATION BETWEEN DETERIORATION OF ELECTRODES AND SPECTRAL LINE WIDTH $\Delta$, SO THAT ELECTRODES TEND TO BE DETERIORATED WHEN SPECTRAL LINE WIDTH IS EXPANDED HERE, SPECTRAL LINE WIDTH MAY BE, FOR EXAMPLE, FULL WIDTH HALF MAXIMUM OR WIDTH IN WHICH 95% OF ENERGY FALLS |
| | INPUT ENERGY | INPUT ENERGY TO ELECTRODES TEND TO BE PROPORTIONAL TO DETERIORATION OF ELECTRODES PER DISCHARGE OF ONE TIME $E_{in}=(1/2)C_o \cdot V^2$ $C_o$: CAPACITY OF CHARGING CONDENSER OF PPM, V: CHARGE VOLTAGE |
| | INTEGRATED VALUE OF INPUT ENERGY AFTER REPLACEMENT OF LASER CHAMBER | INTEGRATED VALUE $E_{insum}$ OF INPUT ENERGY TO ELECTRODES TEND TO BE PROPORTIONAL TO ACCUMULATION OF DETERIORATION OF ELECTRODES $E_{INSUM}=E_{in}(1)+E_{in}(2)+\cdots E_{in}(Np)$ |
| PARAMETER OF PULSE ENERGY STABILITY | PULSE ENERGY | PULSE ENERGY E OF PULSE LASER LIGHT OUTPUT FROM LASER DEVICE, AND MAY BE AVERAGE VALUE |
| | VARIATION OF PULSE ENERGY | VARIATION OF PULSE ENERGY $E\sigma=E_s/E_{av} \cdot 100(\%)$ $E_s$: m PIECES OF STANDARD DEVIATION VALUE OF PULSE ENERGY (E(1), E(2),···, E(m)) $E_{av}$: m PIECES OF AVERAGE VALUE OF PULSE ENERGY (E(1), E(2),···, E(m)) |
| | VARIATION OF INTEGRATED VALUE OF PULSE ENERGY | VARIATION OF INTEGRATED VALUE OF PULSE ENERGY $D\sigma=D_s/D_{av} \cdot 100(\%)$ $D_s$: o PIECES OF STANDARD DEVIATION VALUE OF INTEGRATED VALUE D OF PULSE ENERGY (D(1), D(2),···, D(o)) $D_{av}$: o PIECES OF AVERAGE VALUE OF INTEGRATED VALUE D OF PULSE ENERGY (D(1), D(2),···, D(o)) D: q PIECES OF INTEGRATED VALUE D OF PULSE ENERGY $D(1)=E(1)+E(2)+\cdots+E(q), D(2)=E(2)+E(3)+\cdots+E(q+1)$ |

FIG. 29

| MAJOR ITEM | SPECIFIC EXAMPLE | DESCRIPTION |
|---|---|---|
| GAS CONROL PARAMETER | LASER CHAMBER GAS PRESSURE | LASER CHAMBER GAS PRESSURE P IS PARAMETER HAVING INFLUENCE ON PULSE ENERGY OF PULSE LASER LIGHT OUTPUT FROM LASER DEVICE, AND MAY BE AVERAGE VALUE |
| | CHARGE VOLTAGE | CHARGE VOLTAGE V IS PARAMETER HAVING INFLUENCE ON PULSE ENERGY OF PULSE LASER LIGHT OUTPUT FROM LASER DEVICE, AND MAY BE AVERAGE VALUE |
| | INTEGRATED VALUE OF HALOGEN GAS INJECTION AMOUNT AFTER REPLACEMENT OF LASER CHAMBER | INTEGRATED VALUE OF HALOGEN GAS INJECTION AMOUNT IS PARAMETER CORRELATED WITH DETERIORATION OF DISCHARGE ELECTRODES AND MAY BE SUBSTITUTED WITH NUMBER OF TIMES OF INJECTING CONSTANT AMOUNT OF HALOGEN GAS AFTER LASER CHAMBER REPLACEMENT |
| | HALOGEN GAS INJECTION AMOUNT PER UNIT NUMBER OF OSCILLATION PULSES | HALOGEN GAS INJECTION AMOUNT PER UNIT NUMBER OF OSCILLATION PULSES IS PARAMETER WHICH TENDS TO INCREASE AS APPROACHING END OF LIFETIME OF LASER CHAMBER MAY BE SUBSTITUTED WITH NUMBER OF TIMES OF INJECTING HALOGEN GAS PER UNIT NUMBER OF OSCILLATION PULSES |
| | INTEGRATED VALUE OF LASER GAS INJECTION AMOUNT AFTER REPLACEMENT OF LASER CHAMBER | INTEGRATED VALUE OF LASER GAS INJECTION AMOUNT AFTER REPLACEMENT OF LASER CHAMBER IS PARAMETER CORRELATED WITH AMOUNT OF IMPURITY GAS HAVING EXISTED IN CHAMBER, AND MAY BE INTEGRATED VALUE OF SUM OF LASER GAS AMOUNT THROUGH TOTAL GAS REPLACEMENT AND LASER GAS AMOUNT THROUGH PARTIAL GAS REPLACEMENT OF LASER GAS AFTER LASER CHAMBER REPLACEMENT MAY BE SUBSTITUTED WITH NUMBER OF TIMES OF TOTAL GAS REPLACEMENT OR PARTIAL GAS REPLACEMENT OF LASER GAS |
| | LASER GAS INJECTION AMOUNT PER UNIT NUMBER OF OSCILLATION PULSES | LASER GAS INJECTION AMOUNT PER UNIT NUMBER OF OSCILLATION PULSES IS PARAMETER WHICH TENDS TO INCREASE AS APPROACHING END OF LIFETIME OF LASER CHAMBER MAY BE SUBSTITUTED WITH NUMBER OF TIMES OF TOTAL GAS REPLACEMENT OR PARTIAL GAS REPLACEMENT PER UNIT NUMBER OF OSCILLATION PULSES |
| | CHARGE VOLTAGE AFTER ADJUSTMENT OSCILLATION AFTER TOTAL GAS REPLACEMENT | WHEN CHARGE VOLTAGE IS CONTROLLED AT CONSTANT TOTAL GAS PRESSURE, ADJUSTMENT OSCILLATION IS PERFORMED AFTER TOTAL GAS REPLACEMENT INITIAL CHARGE VOLTAGE Vini FOR RECOVERING LASER PERFORMANCE |
| | LASER CHAMBER GAS PRESSURE AFTER ADJUSTMENT OSCILLATION AFTER TOTAL GAS REPLACEMENT | WHEN TOTAL GAS PRESSURE IS CONTROLLED SO THAT CHARGE VOLTAGE IS WITHIN PREDETERMINED RANGE, ADJUSTMENT OSCILLATION IS PERFORMED AFTER TOTAL GAS REPLACEMENT INITIAL GAS PRESSURE Pini IN LASER CHAMBER FOR RECOVERING LASER PERFORMANCE |

FIG. 30

| MAJOR ITEM | SPECIFIC EXAMPLE | DESCRIPTION |
|---|---|---|
| OPERATION LOAD PARAMETER | AVERAGE OUTPUT OF LASER LIGHT OUTPUT FROM LASER DEVICE | AVERAGE OUTPUT PW IS PARAMETER IN PROPORTIONAL WITH THERMAL LOAD OF LASER CHAMBER $PW=Nt*E/T$ T: SAMPLING TIME, Nt: NUMBER OF PULSES DURING TIME T, E: PULSE ENERGY WHEN PULSE ENERGY E IS NOT CONSTANT, MAY BE ACQUIRED BY INTEGRATING PULSE ENERGY DURING SAMPLING TIME (Esum) $PW=Esum/T$ T MAY BE 30 TO 3000 SECONDS |
| | DUTY DURING BURST OPERATION | OPERATION LOAD PARAMETER MAY BE SUBSTITUTED WITH FOLLOWING PARAMETER WHEN REPETITION FREQUENCY DURING BURST ON AND PULSE ENERGY E DURING BURST ON ARE CONSTANT, MAY BE SUBSTITUTED WITH DUTY DURING BURST OPERATION $Duty=Don/Tb*100$ (%) |
| DETERIORATION PARAMETER OF OPTICAL ELEMENT OF LASER RESONATOR | NUMBER OF OSCILLATION PULSES AFTER WINDOW REPLACEMENT | DETERIORATION OF WINDOW DEPENDS ON NUMBER OF OSCILLATION PULSES Npw AFTER WINDOW REPLACEMENT |
| | INTEGRATED VALUE OF PULSE ENERGY AFTER WINDOW REPLACEMENT | ACCUMULATION PARAMETER W1PSUM OF DETERIORATION OF WINDOW DUE TO ONE BEAM ABSORPTION $W1psum=E(1)+E(2)+E(3)+\cdots+E(Npw)$ WHEN PULSE ENERGY IS SUBSTANTIALLY CONSTANT, MAY BE SUBSTITUTED WITH NUMBER OF OSCILLATION PULSES Npw |
| | INTEGRATED VALUE OF SQUARE OF PULSE ENERGY AFTER WINDOW REPLACEMENT | ACCUMULATION PARAMETER W2psum OF DETERIORATION OF WINDOW DUE TO TWO BEAM ABSORPTION $W2psum=E(1)^2+E(2)^2+E(3)^2+\cdots+E(Npw)^2$ WHEN PULSE ENERGY IS SUBSTANTIALLY CONSTANT, MAY BE SUBSTITUTED WITH NUMBER OF OSCILLATION PULSES Npw |
| | NUMBER OF OSCILLATION PULSES AFTER LNM REPLACEMENT | DETERIORATION OF OPTICAL ELEMENT OF LNM DEPENDS ON NUMBER OF OSCILLATION PULSES Npl AFTER LNM REPLACEMENT |
| | INTEGRATED VALUE OF PULSE ENERGY AFTER LNM REPLACEMENT | ACCUMULATION PARAMETER LNM1PSUM OF DETERIORATION OF OPTICAL ELEMENT DUE TO ONE BEAM ABSORPTION $LNM1psum=E(1)+E(2)+E(3)+\cdots+E(NpL)$ WHEN PULSE ENERGY IS SUBSTANTIALLY CONSTANT, MAY BE SUBSTITUTED WITH NUMBER OF OSCILLATION PULSES NpL |
| | INTEGRATED VALUE OF SQUARE OF PULSE ENERGY AFTER LNM REPLACEMENT | ACCUMULATION PARAMETER LNM2PSUM OF DETERIORATION OF OPTICAL ELEMENT DUE TO TWO BEAM ABSORPTION $LNM2psum=E(1)^2+E(2)^2+E(3)^2+\cdots+E(NpL)^2$ WHEN PULSE ENERGY IS SUBSTANTIALLY CONSTANT, MAY BE SUBSTITUTED WITH NUMBER OF OSCILLATION PULSES NpL |
| | NUMBER OF OSCILLATION PULSES AFTER OC REPLACEMENT | DETERIORATION OF OC DEPENDS ON NUMBER OF OSCILLATION PULSES Npo AFTER OC REPLACEMENT |
| | INTEGRATED VALUE OF PULSE ENERGY AFTER OC REPLACEMENT | ACCUMULATION PARAMETER OC1psum OF DETERIORATION OF OPTICAL ELEMENT DUE TO ONE BEAM ABSORPTION $OC1psum=E(1)+E(2)+E(3)+\cdots+E(NpO)$ WHEN PULSE ENERGY IS SUBSTANTIALLY CONSTANT, MAY BE SUBSTITUTED WITH NUMBER OF OSCILLATION PULSES NpO |
| | INTEGRATED VALUE OF SQUARE OF PULSE ENERGY AFTER OC REPLACEMENT | ACCUMULATION PARAMETER OC2psum OF DETERIORATION OF OPTICAL ELEMENT DUE TO TWO BEAM ABSORPTION $OC2psum=E(1)^2+E(2)^2+E(3)^2+\cdots+E(NpO)^2$ WHEN PULSE ENERGY IS SUBSTANTIALLY CONSTANT, MAY BE SUBSTITUTED WITH NUMBER OF OSCILLATION PULSES NpO |

FIG. 31

| MAJOR ITEM | SPECIFIC EXAMPLE | DESCRIPTION |
|---|---|---|
| DETERIORATION PARAMETER OF OPTICAL ELEMENT OF MONITOR MODULE | NUMBER OF OSCILLATION PULSES AFTER MONITOR MODULE REPLACEMENT | DETERIORATION OF OPTICAL ELEMENT OF MONITOR MODULE DEPENDS ON NUMBER OF OSCILLATION PULSES NpM AFTER MONITOR MODULE REPLACEMENT |
| | INTEGRATED VALUE OF PULSE ENERGY AFTER MONITOR MODULE REPLACEMENT | ACCUMULATION PARAMETER MM1psum OF DETERIORATION OF MONITOR MODULE DUE TO ONE BEAM ABSORPTION $MM1psum=E(1)+E(2)+E(3)+\cdots+E(NpM)$ WHEN PULSE ENERGY IS SUBSTANTIALLY CONSTANT, MAY BE SUBSTITUTED WITH NUMBER OF OSCILLATION PULSES NpM |
| | INTEGRATED VALUE OF SQUARE OF PULSE ENERGY AFTER MONITOR MODULE REPLACEMENT | ACCUMULATION PARAMETER MM2psum OF DETERIORATION OF MONITOR MODULE DUE TO TWO BEAM ABSORPTION $MM2psum=E(1)^2+E(2)^2+E(3)^2+\cdots+E(NpM)^2$ WHEN PULSE ENERGY IS SUBSTANTIALLY CONSTANT, MAY BE SUBSTITUTED WITH NUMBER OF OSCILLATION PULSES NpM |
| DETERIORATION PARAMETER OF OPTICAL SENSOR | DETECTED LIGHT INTENSITY OF IMAGE SENSOR | DETECTED LIGHT INTENSITY OF IMAGE SENSOR MAY BE DETERIORATION PARAMETER OF IMAGE SENSOR DETECTION SENSITIVITY OF IMAGE SENSOR DETERIORATES WHEN IRRADIATED WITH LASER LIGHT SPECIFICALLY, MAY BE PEAK LIGHT INTENSITY OF INTERFERENCE FRINGE GENERATED BY ETALON SPECTROMETER OR INTEGRATED VALUE OF DETECTED LIGHT INTENSITY OF EACH CHANNEL OF IMAGE SENSOR |
| | SPECTRAL LINE WIDTH | PEAK INTENSITY OF IMAGE SENSOR VARIES IN ACCORDANCE WITH SPECTRAL LINE WIDTH PEAK INTENSITY IS LOWERED WHEN SPECTRAL LINE WIDTH IS INCREASED HERE, SPECTRAL LINE WIDTH MAY BE, FOR EXAMPLE, FULL WIDTH HALF MAXIMUM OR WIDTH IN WHICH 95% OF ENERGY FALLS |
| | PULSE ENERGY | PEAK INTENSITY OF IMAGE SENSOR VARIES IN ACCORDANCE WITH PULSE ENERGY PEAK INTENSITY IS LOWERED WHEN SPECTRAL LINE WIDTH IS INCREASED |
| | INTEGRATED VALUE OF PULSE ENERGY | SINCE DETERIORATION OF OPTICAL SENSOR DEPENDS ON EXPOSURE AMOUNT AFTER MONITOR MODULE IS REPLACED, INTEGRATED VALUE Mmpsum OF PULSE ENERGY AFTER MONITOR MODULE IS REPLACED $Mmpsum=E(1)+E(2)+E(3)+\cdots+E(NpM)$ WHEN PULSE ENERGY IS SUBSTANTIALLY CONSTANT, MAY BE SUBSTITUTED WITH NUMBER OF OSCILLATION PULSES NpM |

FIG. 32

| MAJOR ITEM | SPECIFIC EXAMPLE | DESCRIPTION |
|---|---|---|
| | NUMBER OF OSCILLATION PULSES AFTER LNM REPLACEMENT | DETERIORATION OF OPTICAL ELEMENT OF LNM DEPENDS ON NUMBER OF OSCILLATION PULSES NpM AFTER LNM REPLACEMENT |
| DETERIORATION PARAMETER OF OPTICAL ELEMENT OF LNM | INTEGRATED VALUE OF PULSE ENERGY AFTER LNM REPLACEMENT | ACCUMULATION PARAMETER LNM1psum OF DETERIORATION OF OPTICAL ELEMENT DUE TO ONE BEAM ABSORPTION<br>$LNM1psum = E(1) + E(2) + E(3) + \cdots + E(NpL)$<br>WHEN PULSE ENERGY IS SUBSTANTIALLY CONSTANT, MAY BE SUBSTITUTED WITH NUMBER OF OSCILLATION PULSES NpL |
| | INTEGRATED VALUE OF SQUARE OF PULSE ENERGY AFTER LNM REPLACEMENT | ACCUMULATION PARAMETER LNM2psum OF DETERIORATION OF OPTICAL ELEMENT DUE TO TWO BEAM ABSORPTION<br>$LNM2psum = E(1)^2 + E(2)^2 + E(3)^2 + \cdots + E(NpL)^2$<br>WHEN PULSE ENERGY IS SUBSTANTIALLY CONSTANT, MAY BE SUBSTITUTED WITH NUMBER OF OSCILLATION PULSES NpL |
| DETERIORATION PARAMETER OF WAVELENGTH ACTUATOR | WAVELENGTH STABILITY | WAVELENGTH STABILITY IS STANDARD DEVIATION VALUE $\lambda\sigma$ AND ABOUT WAVELENGTH ACTUATOR<br>FOR EXAMPLE, DETERIORATION DEGREE OF ROTATION STAGE OF PRISM MAY BE INDEX VARIATION OF WAVELENGTH STABILITY<br>$\lambda\sigma =$ STANDARD DEVIATION VALUE $(\lambda(1), \lambda(2), \cdots, \lambda(m))$<br>m: SAMPLE NUMBER |
| DETERIORATION PARAMETER OF WAVEFRONT | SPECTRAL LINE WIDTH | SPECTRAL LINE WIDTH $\Delta\lambda$ MAY BE INDEX OF DISTORTION OF TRANSMISSION WAVEFRONT OR DIFFRACTION WAVEFRONT OF OPTICAL ELEMENT IN LNM<br>HERE, SPECTRAL LINE WIDTH MAY BE, FOR EXAMPLE, FULL WIDTH HALF MAXIMUM OR WIDTH IN WHICH 95% OF ENERGY FALLS |

TRAINING DATA CREATION METHOD, MACHINE LEARNING METHOD, CONSUMABLE MANAGEMENT DEVICE, AND COMPUTER READABLE MEDIUM

The present application claims the benefit of International Application No. PCT/JP2020/028095, filed on Jul. 20, 2020 the entire contents of which are hereby incorporated by reference.

BACKGROUND

1. Technical Field

The present disclosure relates to a training data creation method, a machine learning method, a consumable management device, and a computer readable medium.

2. Related Art

Improvement in resolution of a semiconductor exposure apparatus has been desired for miniaturization and high integration of semiconductor integrated circuits. Hereinafter, a semiconductor exposure apparatus is simply referred to as an "exposure apparatus." For this purpose, an exposure light source that outputs light having a shorter wavelength has been developed. As the exposure light source, a gas laser device is used in place of a conventional mercury lamp. As a gas laser device for exposure, a KrF excimer laser device that outputs ultraviolet light having a wavelength of 248 nm and an ArF excimer laser device that outputs ultraviolet light having a wavelength of 193 nm are currently used.

As current exposure technology, immersion exposure is practically used in which a gap between a projection lens of an exposure apparatus and a wafer is filled with a liquid and a refractive index of the gap is changed to reduce an apparent wavelength of light from an exposure light source. When the immersion exposure is performed using the ArF excimer laser device as the exposure light source, the wafer is irradiated with ultraviolet light having a wavelength of 134 nm in water. This technology is referred to as ArF immersion exposure. The ArF immersion exposure is also referred to as ArF immersion lithography.

Since the KrF excimer laser device and the ArF excimer laser device have a large spectral line width of about 350 to 400 μm in natural oscillation, chromatic aberration of laser light (ultraviolet light), which is reduced and projected on a wafer by a projection lens of an exposure apparatus, occurs to deteriorate resolution. Then, a spectral line width of laser light output from the gas laser device needs to be narrowed to the extent that the chromatic aberration can be ignored. The spectral line width is also referred to as a spectral width. For this purpose, a line narrowing module (LNM) having a line narrowing element is provided in a laser resonator of the gas laser device to narrow the spectral width. The line narrowing element may be an etalon, a grating, or the like. A laser device with such a narrowed spectral width is referred to as a line narrowing laser device.

LIST OF DOCUMENTS

Patent Documents

Patent Document 1: US Patent Application Publication No. 2018/0246494
Patent Document 2: U.S. Pat. No. 6,219,367
Patent Document 3: U.S. Pat. No. 6,697,695

SUMMARY

A training data creation method according to an aspect of the present disclosure is used for machine learning of a learning model for predicting lifetime of a consumable of a laser device. The method includes acquiring first lifetime-related information including data of at least one lifetime-related parameter of the consumable recorded in association with each of numbers of oscillation pulses during a period from start of use to replacement of the consumable, determining a first deterioration degree of the consumable based on the number of oscillation pulses, determining a second deterioration degree of the consumable based on at least the one lifetime-related parameter, determining a third deterioration degree of the consumable based on the first deterioration degree and the second deterioration degree, and creating training data in which the first lifetime-related information and the third deterioration degree are associated with each other.

A machine learning method according to another aspect of the present disclosure is for creating a learning model for predicting lifetime of a consumable of a laser device. The method includes acquiring first lifetime-related information including data of at least one lifetime-related parameter of the consumable recorded in association with each of numbers of oscillation pulses during a period from start of use to replacement of the consumable, determining a first deterioration degree of the consumable based on the number of oscillation pulses, determining a second deterioration degree of the consumable based on the at least one lifetime-related parameter, determining a third deterioration degree of the consumable based on the first deterioration degree and the second deterioration degree, creating training data in which the first lifetime-related information and the third deterioration degree are associated with each other, creating the learning model for predicting a deterioration degree of the consumable based on data of the lifetime-related parameter included in the first lifetime-related information by performing machine learning using the training data, and storing the created learning model.

A computer readable medium according to an aspect of the present disclosure is a computer readable medium which is non-transitory and in which a program is recorded. Here, the program causes a computer, when executed by the computer, to actualize a function of creating training data to be used for machine learning of a learning model for predicting lifetime of a consumable of a laser device. The program includes an instruction to cause the computer to actualize a function of acquiring first lifetime-related information which includes data of at least one lifetime-related parameter of the consumable recorded corresponding to each of numbers of oscillation pulses during a period from start of use to replacement of the consumable, a function of determining a first deterioration degree of the consumable based on the number of oscillation pulses, a function of determining a second deterioration degree of the consumable based on the at least one lifetime-related parameter, a function of determining a third deterioration degree of the consumable based on the first deterioration degree and the second deterioration degree, and a function of creating training data in which the first lifetime-related information and the third deterioration degree are associated with each other.

BRIEF DESCRIPTION OF THE DRAWINGS

Embodiments of the present disclosure will be described below merely as examples with reference to the accompanying drawings.

FIG. 1 is a diagram schematically showing the configuration of an exemplary laser device.

FIG. 24 is a graph showing an example of calculating a lifetime and a remaining lifetime of the laser chamber using the created learning model.

FIG. 25 is a table showing an example of a probability for each deterioration degree in which level division is performed in 10 levels.

FIG. 26 is a diagram showing an example of a process of predicting the lifetime of the consumable by the neural network model in which learning is completed.

FIG. 28 is a table showing an example of the lifetime-related information of the laser chamber.

FIG. 29 is a table showing an example of the lifetime-related information of the laser chamber.

FIG. 30 is a table showing an example of the lifetime-related information of the laser chamber.

FIG. 31 is a table showing an example of the lifetime-related information of a monitor module.

FIG. 32 is a table showing an example of the lifetime-related information of a line narrowing module.

DESCRIPTION OF EMBODIMENTS

Figure 2:
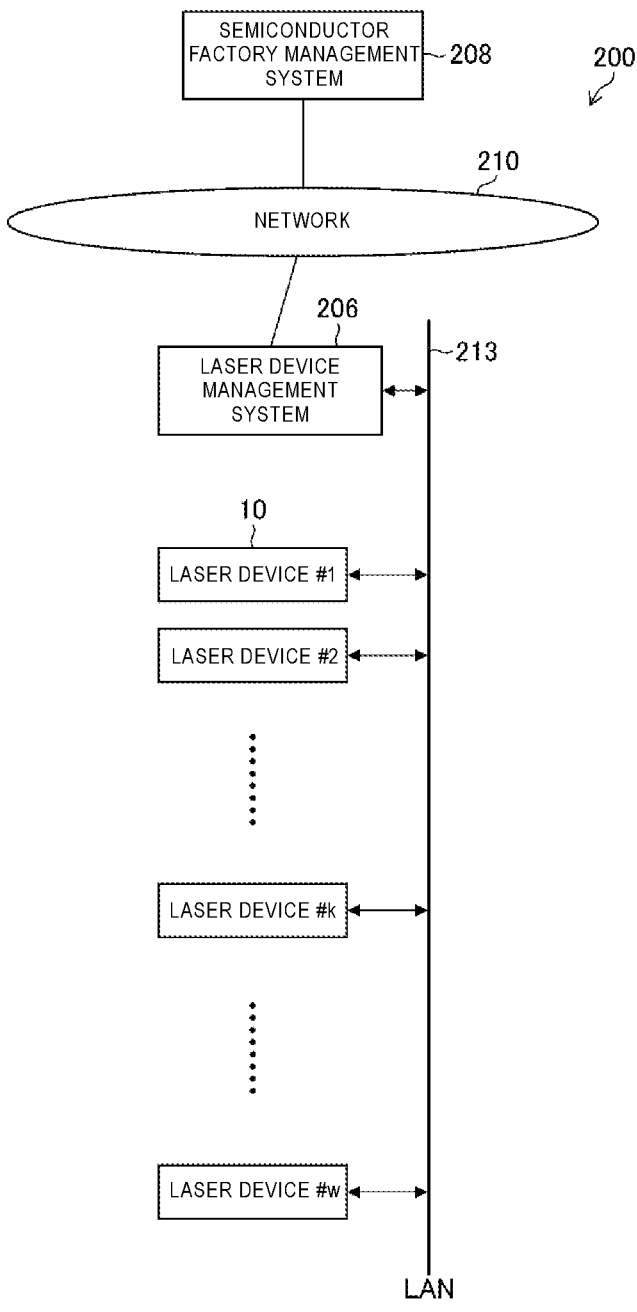
FIG. 2 is a diagram schematically showing a configuration example of a laser management system in a semiconductor factory.

<Contents>
1. Description of terms
2. Description of laser device
  2.1 Configuration
  2.2 Operation
  2.3 Maintenance of main consumables of laser device
  2.4 Others
3. Example of laser management system in semiconductor factory
  3.1 Configuration
  3.2 Operation
4. Problem
5. First embodiment
  5.1 Configuration
  5.2 Operation
    5.2.1 Overview of machine learning operation in consumable management server
    5.2.2 Overview of lifetime prediction operation of consumables in consumable management server
    5.2.3 Processing example of data acquisition unit
    5.2.4 Processing example of learning model creation unit
    5.2.5 Creation example 1 of learning model used for lifetime prediction of laser chamber
    5.2.6 Creation example 2 of learning model used for lifetime prediction of laser chamber
    5.2.7 Example of combining a plurality of parameters to be converted into one parameter
    5.2.8 Description of case in which data D(s) includes a plurality pieces of data
    5.2.9 Example of neural network model
    5.2.10 Learning mode of neural network model
    5.2.11 Processing example of consumable lifetime prediction unit
    5.2.12 Example of process for calculating lifetime of consumable using learning model
    5.2.13 Lifetime prediction mode of neural network model
    5.2.14 Others
    5.2.15 Processing example of data output unit
  5.3 Lifetime-related information of laser chamber
  5.4 Example of lifetime-related information of monitor module 5.5 Example of lifetime-related information of line narrowing module 5.6 Effect 5.7 Others 6. Modification 7. Computer readable medium in which program is recorded Hereinafter, embodiments of the present disclosure will be described in detail with reference to the drawings.

The embodiments described below show some examples of the present disclosure and do not limit the contents of the present disclosure. Also, all configurations and operation described in the embodiments are not necessarily essential as configurations and operation of the present disclosure. Here, the same components are denoted by the same reference numerals, and duplicate description thereof is omitted.

1. Description of Terms

"Consumable" is used as a generic term to refer to items such as components and modules that require periodic maintenance. Replacement parts and replacement modules are included in the concept of "consumable." A module may be understood as a form of a component. In the present specification, the term "consumable" may be used synonymously with "replacement module or replacement component." Maintenance includes replacement of a consumable. The concept of "replacement" includes replacing a consumable with a new one, as well as maintaining and/or recovering the function of the component by performing cleaning or the like on a consumable and repositioning the same consumable.

"Burst operation" means operation in which a burst period in which line narrowed pulse laser light is continuously oscillated in accordance with exposure and an oscillation pause period in which oscillation is paused in accordance with movement of a stage are alternately repeated.

2. Description of Laser Device

2.1 Configuration

Figure 1:
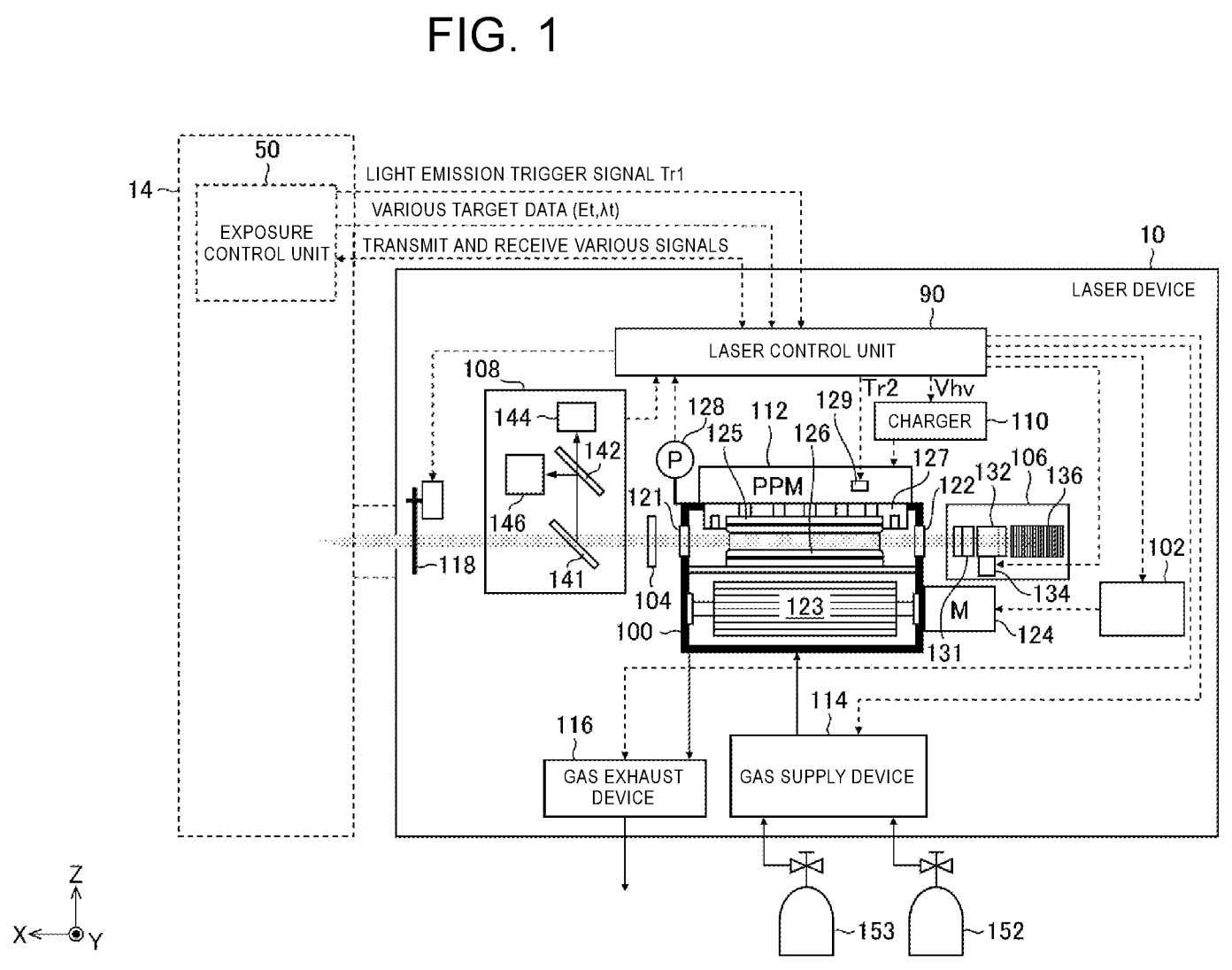

FIG. 1 schematically shows an exemplary configuration of a laser device 10. The laser device 10 is, for example, a KrF excimer laser device, and includes a laser control unit 90, a laser chamber 100, an inverter 102, an output coupling mirror 104, a line narrowing module (LNM) 106, a monitor module 108, a charger 110, a pulse power module (PPM) 112, a gas supply device 114, a gas exhaust device 116, and an outlet port shutter 118.

The laser chamber 100 includes a first window 121, a second window 122, a cross flow fan (CFF) 123, a motor 124 which rotates the CFF 123, a pair of electrodes 125, 126, an electric insulator 127, a pressure sensor 128, and a heat exchanger (not shown).

The inverter 102 is a power supply device for the motor 124. The inverter 102 receives, from the laser control unit 90, a command signal which specifies the frequency of the power supplied to the motor 124.

The PPM 112 is connected to the electrode 125 via a feedthrough in the electric insulator 127 of the laser chamber 100. The PPM112 includes a semiconductor switch 129, a charging capacitor (not shown), a pulse transformer (not shown), and a pulse compression circuit (not shown).

The output coupling mirror 104 is a partial reflection mirror and is arranged to configure an optical resonator together with the line narrowing module 106. The laser chamber 100 is arranged on the optical path of the optical resonator.

The line narrowing module 106 includes a beam expander using a first prism 131 and a second prism 132, a rotation stage 134, and a grating 136. The first prism 131 and the second prism 132 are arranged to expand the beam of light output from the second window 122 of the laser chamber 100 and is incident on the grating 136.

Here, the grating 136 is arranged in the Littrow arrangement so that the incident angle and the diffraction angle of the laser light coincide with each other. The second prism 132 is arranged on the rotation stage 134 such that the incident angle and the diffraction angle of the laser light on the grating 136 change when the rotation stage 134 rotates.

The monitor module 108 includes a first beam splitter 141, a second beam splitter 142, a pulse energy detector 144, and a spectral detector 146. The first beam splitter 141 is arranged on the optical path of the laser light output from the output coupling mirror 104, and is arranged so that a part of the laser light is reflected to be incident on the second beam splitter 142.

The pulse energy detector 144 is arranged so that the laser light transmitted through the second beam splitter 142 is incident thereon. The pulse energy detector 144 may be, for example, a photodiode that measures the light intensity of ultraviolet light. The second beam splitter 142 is arranged so that a part of the laser light is reflected to be incident on the spectral detector 146.

The spectral detector 146 is, for example, a monitor etalon measurement device that measures interference fringes generated by an etalon with an image sensor. The center wavelength and the spectral line width of the laser light are measured based on the generated interference fringes.

The gas supply device 114 in the case of the KrF excimer laser apparatus is connected, via a pipe, to each of an inert gas supply source 152 which is a supply source of an inert laser gas and a halogen gas supply source 153 which is a supply source of a laser gas containing halogen. The inert laser gas is a mixed gas of a Kr gas and an Ne gas. The laser gas containing halogen is a mixed gas of an $F_2$ gas, a Kr gas, and an Ne gas. The gas supply device 114 is connected to the laser chamber 100 via a pipe.

The gas supply device 114 includes an automatic valve (not shown) and a mass flow controller (not shown) for supplying a predetermined amount of the inert laser gas or the laser gas containing halogen to the laser chamber 100.

The gas exhaust device 116 is connected to the laser chamber 100 via a pipe. The gas exhaust device 116 includes a halogen filter (not shown) for removing halogen and an exhaust pump (not shown), and is configured to exhaust the laser gas from which halogen is removed to the outside.

The outlet port shutter 118 is arranged on the optical path of the laser light output from the laser device 10 to the outside.

The laser device 10 is arranged such that the laser light output from the laser device 10 via the outlet port shutter 118 enters the exposure apparatus 14.

2.2 Operation

Operation of the laser device 10 will be described. The laser control unit 90 exhausts the gas in the laser chamber 100 through the gas exhaust device 116, and then fills the laser chamber 100 through the gas supply device 114 with the inert laser gas and the laser gas containing halogen so as to have desired gas compositions and total gas pressure.

The laser control unit 90 rotates the motor 124 at a predetermined number of revolution via the inverter 102 to rotate the CFF 123. As a result, the laser gas flows between the electrodes 125, 126.

The laser control unit 90 receives a target pulse energy Et from the exposure control unit 50 of the exposure apparatus 14, and transmits data of a charge voltage Vhv to the charger 110 so that the pulse energy becomes Et.

The charger 110 charges the charging capacitor of the PPM 112 so that the charge voltage Vhv is acquired. When a light emission trigger signal Tr1 is output from the exposure apparatus 14, a trigger signal Tr2 is input from the laser control unit 90 to the semiconductor switch 129 of the PPM 112 in synchronization with the light emission trigger signal Tr1. When the semiconductor switch 129 operates, current pulses are compressed by a magnetic compression circuit of the PPM 112 and a high voltage is applied between the electrodes 125, 126. As a result, discharge occurs between the electrodes 125, 126, and the laser gas is excited in the discharge space. The electrodes 125, 126 are examples of "discharge electrodes" in the present disclosure.

Excimer light is generated when the excited laser gas in the discharge space reaches the ground state. The excimer light reciprocates between the output coupling mirror 104 and the line narrowing module 106 and is amplified, thereby causing laser oscillation. As a result, the line-narrowed pulse laser light is output from the output coupling mirror 104.

The pulse laser light output from the output coupling mirror 104 enters the monitor module 108. In the monitor module 108, a part of the laser light is sampled by the first beam splitter 141 and is incident on the second beam splitter 142. The second beam splitter 142 transmits a part of the incident laser light to be incident on the pulse energy detector 144, and reflects the other part to be incident on the spectral detector 146.

The pulse energy E of the pulse laser light output from the laser device 10 is measured by the pulse energy detector 144, and data of the measured pulse energy E is transmitted from the pulse energy detector 144 to the laser control unit 90.

Further, the center wavelength A and the spectral line width DA are measured by the spectral detector 146, and data of the measured center wavelength A and the measured spectral line width DA is transmitted from the spectral detector 146 to the laser control unit 90.

The laser control unit 90 receives data of the target pulse energy Et and the target wavelength $\lambda t$ from the exposure apparatus 14. The laser control unit 90 controls the pulse energy based on the pulse energy E measured by the pulse energy detector 144 and the target pulse energy Et. The control of the pulse energy includes controlling the charge voltage Vhv such that the difference $\Delta E = E - Et$ between the pulse energy E measured by the pulse energy detector 144 and the target pulse energy Et approaches 0.

The laser control unit 90 controls the wavelength based on the center wavelength $\lambda$ measured by the spectral detector 146 and the target wavelength $\lambda t$. The control of the wavelength includes controlling the rotation angle of the rotation stage 134 such that the difference $\delta\lambda = \lambda - \lambda t$ between the center wavelength $\lambda$ measured by the spectral detector 146 and the target wavelength $\lambda t$ approaches 0.

As described above, the laser control unit 90 receives the target pulse energy Et and the target wavelength $\lambda t$ from the exposure apparatus 14, and causes the laser device 10 to output the pulse laser light in synchronization with the light emission trigger signal Tr1 each time the light emission trigger signal Tr1 is input.

When the laser device 10 repeats discharge, the electrodes 125, 126 are consumed, the halogen gas in the laser gas is consumed, and an impurity gas is generated. The decrease in the halogen gas concentration and the increase of the impurity gas in the laser chamber 100 cause a decrease of the pulse energy of the pulse laser light and the stability of the pulse energy is adversely affected. The laser control unit 90 executes, for example, the following gas control in order to suppress these adverse effects.

[1] Halogen Injection Control

The halogen injection control is gas control in which, during laser oscillation, the amount of halogen gas consumed mainly by discharge in the laser chamber 100 is replenished to the laser chamber 100 by injecting a gas containing halogen at a higher concentration than the halogen gas in the laser chamber 100.

[2] Partial Gas Replacement Control

The partial gas replacement control is gas control in which, during laser oscillation, a part of the laser gas in the laser chamber 100 is replaced with a new laser gas so as to suppress an increase in the concentration of the impurity gas in the laser chamber 100.

[3] Gas Pressure Control

The gas pressure control is gas control in which the pulse energy is controlled by injecting the laser gas into the laser chamber 100 to change a gas pressure P of the laser gas. The control of the pulse energy is usually performed by controlling the charge voltage Vhv, but when the decrease of the pulse energy of the pulse laser light output from the laser device 10 cannot be compensated in the control range of the charge voltage Vhv, the gas pressure control is executed.

When the laser gas is exhausted from the laser chamber 100, the laser control unit 90 controls the gas exhaust device 116. The halogen gas is removed from the laser gas exhausted from the laser chamber 100 by a halogen filter (not shown), and the laser gas is exhausted to the outside of the laser device 10.

The laser control unit 90 transmits data of each parameter such as the number of oscillation pulses, the charge voltage Vhv, the gas pressure P in the laser chamber 100, the pulse energy E of the laser light, and the spectral line width DA to a laser device management system 206 (see FIG. 2) via a local area network (not shown).

2.3 Maintenance of Main Consumables of Laser Device

The replacement operation of main consumables performed by a field service engineer (FSE) is the replacement operation of the laser chamber 100, the line narrowing module 106, and the monitor module 108.

The replacement timing of these main consumables is generally managed not by time but by the number of oscillation pulses of the laser device 10. The replacement operation of these main consumables may take from 3 to 10 hours of replacement time. Among these main consumables, the consumable with the longest replacement time is the laser chamber 100.

2.4 Others

In the example shown in FIG. 1, an example of the KrF excimer laser device is shown as the laser device 10, but the present invention is not limited to this example and may be applied to other laser devices. For example, the laser device 10 may be an ArF excimer laser device or an XeCl excimer laser device.

The example shown in FIG. 1 shows the case in which the halogen injection control, the partial gas replacement control, and the gas pressure control are performed as the gas control of the laser device 10, but the gas control is not limited to this example, and for example, the gas pressure control may not necessarily be performed.

3. Example of Laser Management System in Semiconductor Factory

3.1 Configuration

FIG. 2 schematically shows a configuration example of a laser management system 200 in a semiconductor factory. The laser management system 200 includes a plurality of laser devices 10, a laser device management system 206, and a semiconductor factory management system 208.

Each of the laser device management system 206 and the semiconductor factory management system 208 is configured using a computer. Each of the laser device management system 206 and the semiconductor factory management system 208 may be a computer system configured using a plurality of computers. The semiconductor factory management system 208 is connected to the laser device management system 206 via a network 210.

The network 210 is a communication line capable of transmitting information by wired, wireless, or a combination thereof. The network 210 may be a wide area network or a local area network.

In order to identify each of the plurality of laser devices 10, laser device identification signs #1, #2, . . . , #k, . . . , #w are used. Here, w is the number of laser devices 10 included in the laser management system 200 in the semiconductor factory. Here, w is an integer equal to or more than 1. Here, k is an integer equal to or more than 1 and equal to or less than w. Hereinafter, for convenience of explanation, a description of laser device #k may be used in some cases. Here, the laser devices #1 to #w may have the same device configuration, or some or all of the laser devices #1 to #w may have different device configurations from each other.

Each of the laser devices #1 to #w and the laser device management system 206 is connected to a local area network 213. In FIG. 2, the local area network 213 is indicated as "LAN."

3.2 Operation

The laser device management system 206 manages the replacement timing of the main consumables of each of the laser devices #1 to #w mainly by the number of pulses of laser oscillation (the number of oscillation pulses) Np.

The laser device management system 206 may display the maintenance management information on a display terminal or may transmit the maintenance management information to the semiconductor factory management system 208 via the network 210.

The respective management lines for managing the laser devices #1 to #w by the laser device management system 206 are independent from each other, and an administrator of the semiconductor factory determines the replacement timing of the main consumables of each of the laser devices #1 to #w based on the maintenance management information output from each of the laser devices #1 to #w.

Figure 3:
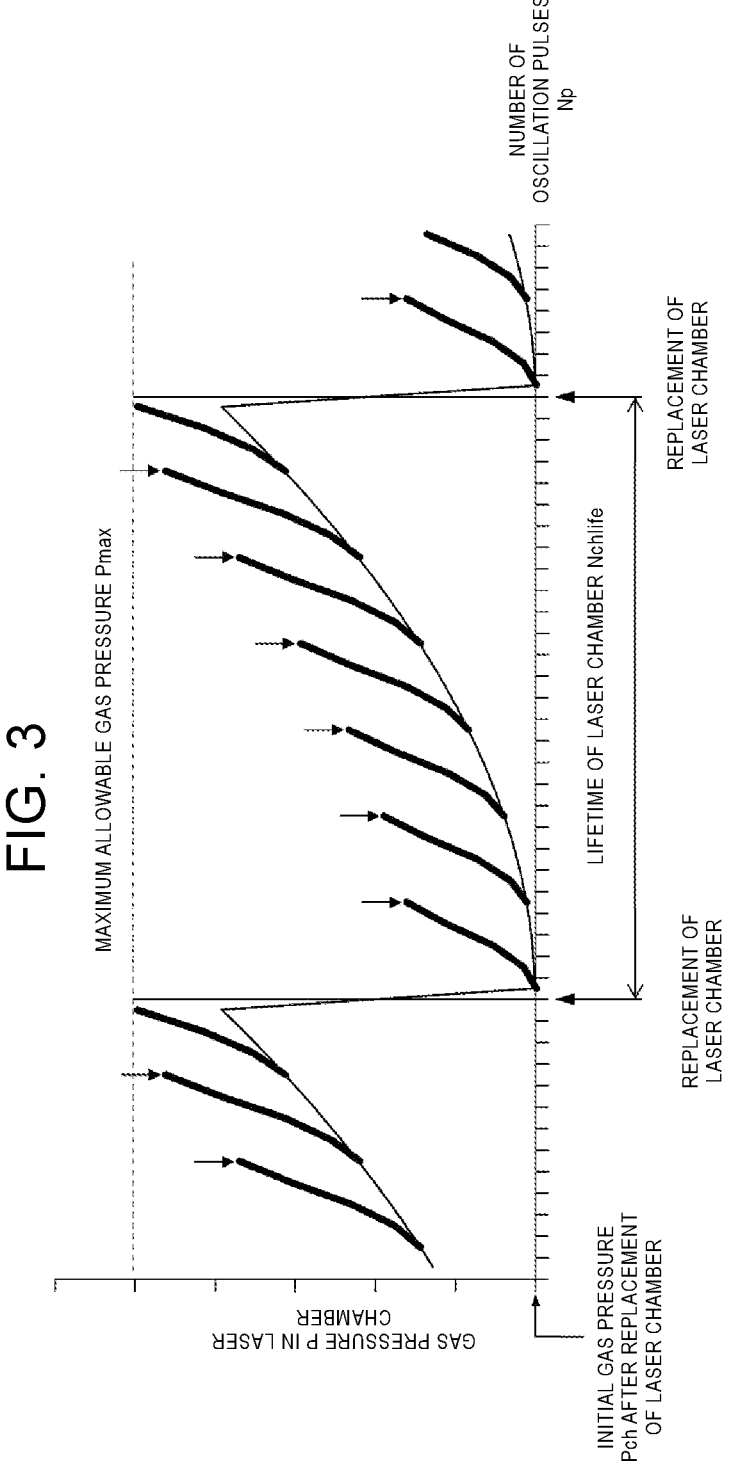
FIG. 3 is a graph showing an example of a typical relationship between the gas pressure in a laser chamber and a number of oscillation pulses.

FIG. 3 is a graph showing an example of a typical relationship between the gas pressure P in the laser chamber 100 and the number of oscillation pulses Np. When the excimer laser device repeats discharge, the electrodes 125, 126 are consumed, the halogen gas in the laser gas is consumed, and an impurity gas is generated. The decrease in the halogen gas concentration and the increase of the impurity gas in the laser chamber 100 cause a decrease of the pulse energy of the pulse laser light and the stability of the pulse energy is adversely affected.

Therefore, in order to maintain the performance of the excimer laser device, the halogen injection control, the partial gas replacement control, the gas pressure control, or total gas replacement is performed according to circumstances. In FIG. 3, the replacement timing of the laser chamber 100 is indicated by upward arrows. The operation after replacement of the laser chamber 100 is as follows.
[Step 1]
The laser performance is maintained at an initial gas pressure Pch as the gas pressure P immediately after the replacement of the laser chamber 100.
[Step 2]
When the laser oscillation is continued, the gas pressure P is increased by the gas pressure control in order to maintain the laser performance due to consumption of the discharge electrodes and generation of the impurity gas. The graph indicated by thick lines in FIG. 3 represents the transition of the gas pressure P in Step 2.
[Step 3]
However, when the laser performance can no longer be maintained even by the gas pressure control, the laser oscillation is stopped and the total gas replacement is performed. In FIG. 3, the timing of the total gas replacement is indicated by downward arrows.
[Step 4]
Adjustment oscillation is performed after the total gas replacement. The gas pressure control is performed to recover laser performance. The gas pressure P when the laser performance is recovered is referred to as the "initial gas pressure after the total gas replacement" and is referred to as Pini.
[Step 5]
Thereafter, Steps 2 to 4 are repeated a plurality of times. The initial gas pressure Pini after the total gas replacement gradually increases as the number of oscillation pulses Np increases. The graph indicated by a thin line in FIG. 3 represents the transition of the initial gas pressure Pini.
[Step 6]
Over time, when the gas pressure P reaches a maximum allowable gas pressure Pmax, a laser chamber lifetime Nchlife is reached.

In the example shown in FIG. 3, for the sake of simplicity, with regard to the lifetime of the laser chamber 100, the process until the end of lifetime is reached has been described based on the change in the gas pressure P in the laser device 10 with respect to the number of oscillation pulses Np. However, it is necessary to satisfy other laser performance such as the pulse energy stability and the spectral line width. Thus, the lifetime of the laser chamber 100 may not be predictable in a simple manner.

4. Problem

[Problem 1]
There is a case in which a value of the number of oscillation pulses as a standard lifetime is determined for each of the main consumables of the laser device. However, due to individual differences of consumables, the number of oscillation pulses reaching the end of lifetime is not constant but varies. Even when the lifetime of a consumable is longer than the standard lifetime, the consumable may be replaced due to periodic maintenance at the time of the standard lifetime. Alternatively, when the lifetime of a consumable is shorter than the standard lifetime, planned replacement of the consumables may not be possible, and the production line may be stopped.

[Problem 2]

Presently, the FSE empirically predicts the lifetime of each of the consumables by checking, for example, the transition of the gas pressure with respect to the number of oscillation pulses as shown in FIG. 3 and log data of other parameters related to the lifetime. Therefore, the prediction of the lifetime of the consumables and handling up to the replacement of the consumables may depend on the personal ability of the FSE.

5. First Embodiment

5.1 Configuration

Figure 4:
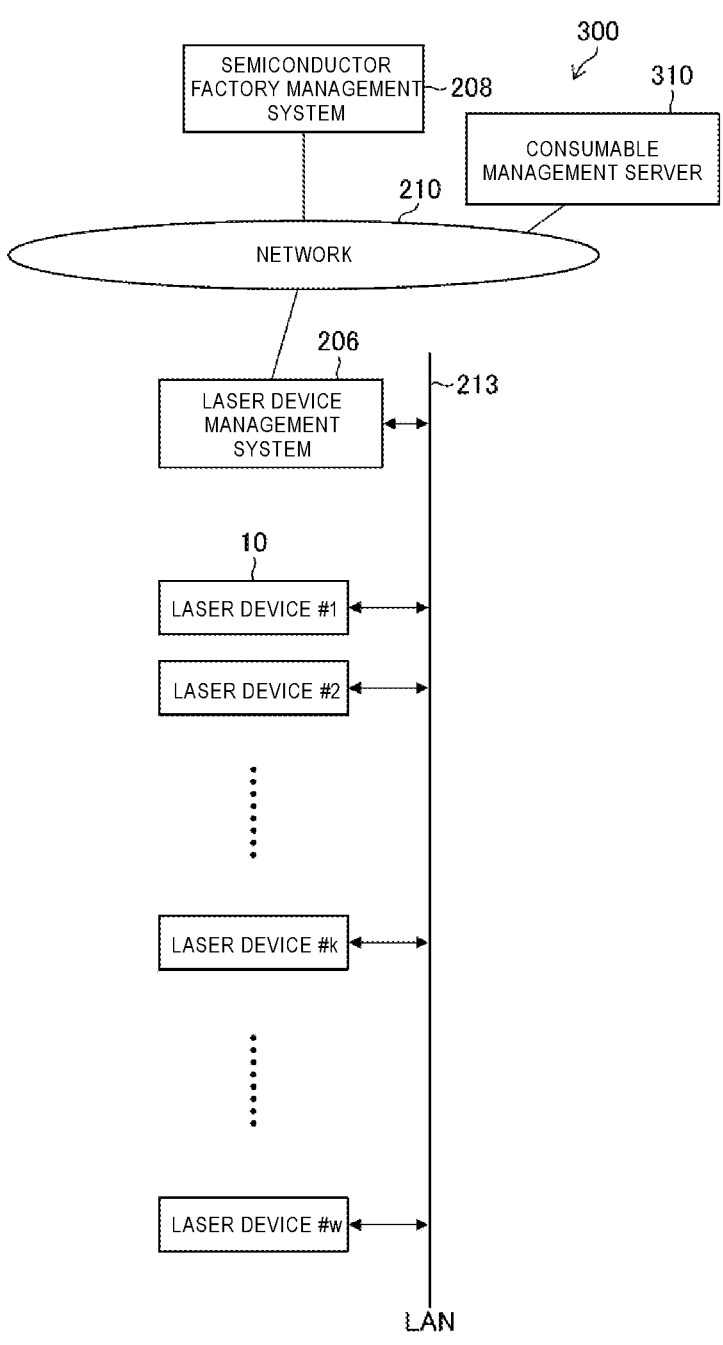
FIG. 4 is a diagram showing the configuration of the laser management system in a semiconductor factory according to a first embodiment.

FIG. 4 is a diagram showing the configuration of a laser management system 300 in a semiconductor factory according to a first embodiment. The configuration shown in FIG. 4 will be described in terms of differences from the configuration shown in FIG. 2. The laser management system 300 in the semiconductor factory shown in FIG. 4 has a configuration in which a consumable management server 310 is added to the configuration of the laser management system 200 shown in FIG. 2. The consumable management server 310 is connected to the laser device management system 206 and the semiconductor factory management system 208 via the network 210.

The consumable management server 310 is configured to be capable of transmitting and receiving data and signals to and from each of the laser device management system 206 and the semiconductor factory management system 208.

Figure 5:
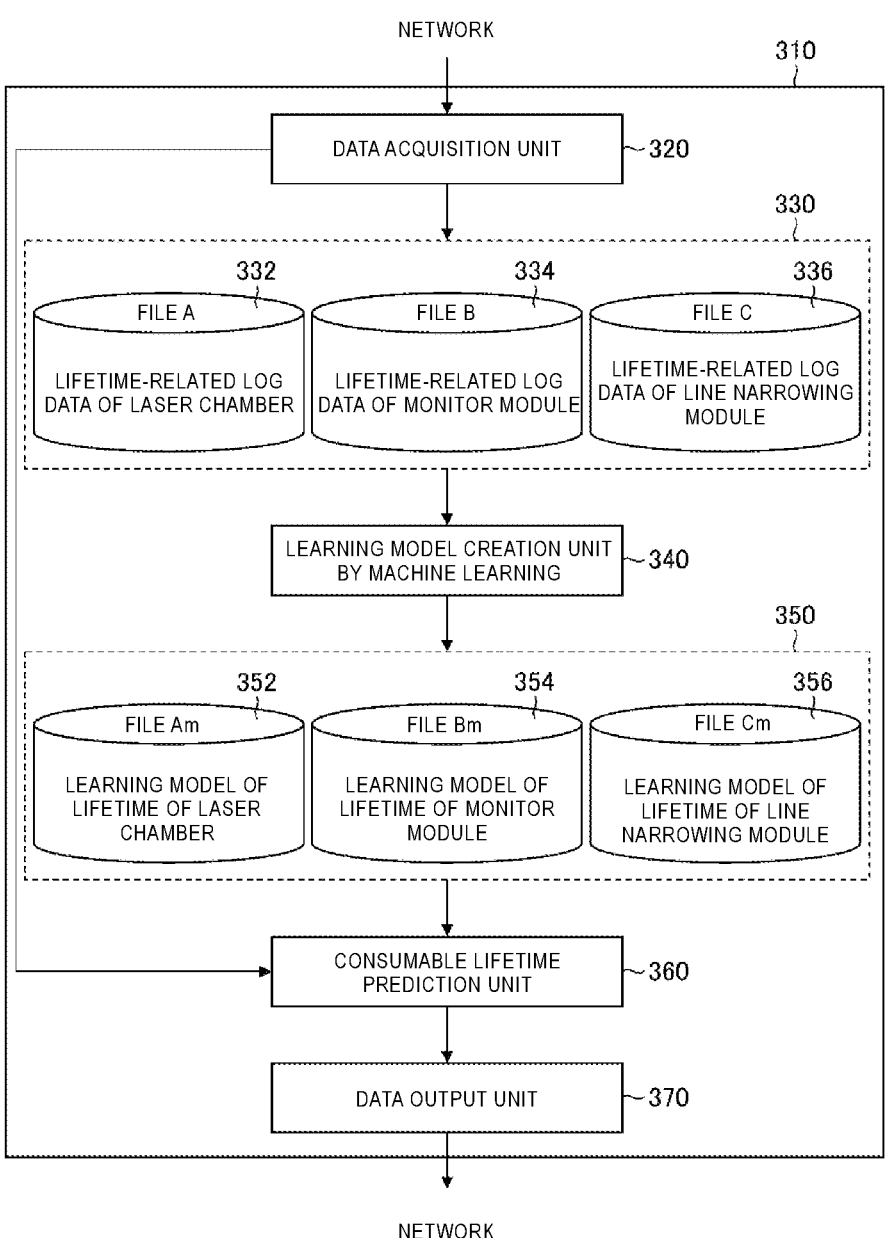
FIG. 5 is a block diagram showing functions of a consumable management server.

FIG. 5 is a block diagram showing functions of the consumable management server 310. The consumable management server 310 includes a data acquisition unit 320, a consumable lifetime-related information storage unit 330, a learning model creation unit 340 using machine learning, a learning model storage unit 350, a consumable lifetime prediction unit 360, and a data output unit 370.

The lifetime-related information of the consumables includes a file A, a file B, and a file C. The file A is a file in which the lifetime-related log data of the laser chamber 100 is stored. The file B is a file in which the lifetime-related log data of the monitor module 108 is stored. The file C is a file in which the lifetime-related log data of the line narrowing module 106 is stored.

The consumable lifetime-related information storage unit 330 includes a storage unit 332 that stores the file A, a storage unit 334 that stores the file B, and a storage unit 336 that stores the file C.

The learning model creation unit 340 is a processing unit that creates a learning model by machine learning. The consumable learning model storage unit 350 stores the learning model created by the learning model creation unit 340. The consumable learning model storage unit 350 includes a storage unit 352 that stores a file Am, a storage unit 354 that stores a file Bm, and a storage unit 356 that stores a file Cm.

The file Am is a file in which a first learning model that performs a process of predicting the lifetime of the laser chamber 100 is stored. The file Bm is a file in which a second learning model that performs a process of predicting the lifetime of the monitor module 108 is stored. The file Cm is a file in which a third learning model that performs a process of predicting the lifetime of the line narrowing module 106 is stored.

The storage units 332, 334, 336, 352, 354, 356 are configured using a storage device such as a hard disk device and/or a semiconductor memory. Each of the storage units 332, 334, 336, 352, 354, 356 may be configured using a separate storage device, or may be configured as a part of a storage area in one or a plurality of storage devices.

In the present disclosure, each of the laser control unit 90, the exposure control unit 50, the laser device management system 206, the semiconductor factory management system 208, and the consumable management server 310 can be realized by a combination of hardware and software of one or a plurality of computers. Software is synonymous with programs. A programmable controller is included in the concept of the computer.

The computer may include, for example, a central processing unit (CPU) and a storage device. A programmable controller is included in the concept of the computer. The computer may include a graphics processing unit (GPU). The CPU and the GPU included in the computer are examples of the processor. The storage device is a non-transitory computer readable medium that is a tangible object, and includes, for example, a memory that is a main storage device and a storage that is an auxiliary storage device. The computer readable medium may be, for example, a semiconductor memory, a hard disk drive (HDD) device, a solid state drive (SSD) device, or a combination thereof. The program executed by the processor is stored in the computer readable medium. The processor may be configured to include a computer readable medium.

Some or all of the functions of various control devices and processing devices such as the laser control unit 90, the exposure control unit 50, the laser device management system 206, the semiconductor factory management system 208, and the consumable management server 310 may be realized using an integrated circuit such as a field programmable gate array (FPGA) and an application specific integrated circuit (ASIC).

The functions of a plurality of control devices and processing devices can be realized by one device. Further, in the present disclosure, the plurality of control devices and processing devices may be connected to each other via a communication network such as a local area network and an Internet line. In a distributed computing environment, program units may be stored in both local and remote memory storage devices. The processors applied to the laser control unit 90, the exposure control unit 50, the laser device management system 206, the semiconductor factory management system 208, the consumable management server 310, and the like are specially configured or programmed to execute various processes included in the present disclosure.

5.2 Operation

5.2.1 Overview of Machine Learning Operation in Consumable Management Server The consumable management server 310 shown in FIG. 5 has a function of performing machine learning for creating a learning model used in a process of predicting the lifetime of the consumables of the laser device 10 and a function of performing a process of predicting the lifetime of the consumables using the created learning model. The consumable management server 310 is an example of the "consumable management device" in the present disclosure. First, a machine learning method for creating a learning model used for predicting the lifetime of the consumables in the consumable management server 310 and a method for creating training data used for the machine learning will be described.

When the consumable is replaced in each of the laser devices 10, the data acquisition unit 320 acquires, from the laser device management system 206, lifetime-related information including all data of lifetime-related parameters continuously recorded in association with the number of oscillation pulses Np over the entire period during the use period of the replaced consumable. The data acquisition unit 320 writes the data acquired from the laser device management system 206 to the consumable lifetime-related information storage unit 330.

The data acquisition unit 320 specifies the file to be written in accordance with the type of the replaced consumable, and writes the data. When the replaced consumable is the laser chamber 100, the data acquisition unit 320 writes the lifetime-related log data, which is the lifetime-related information of the laser chamber 100, in the file A. When the replaced consumable is the monitor module 108, the data acquisition unit 320 writes the lifetime-related log data, which is the lifetime-related information of the monitor module 108, in the file B. When the replaced consumable is the line narrowing module 106, the data acquisition unit 320 writes the lifetime-related log data, which is the lifetime-related information of the line narrowing module 106, in the file C. The log data written in each of the file A, the file B, and the file C is an example of the "first lifetime-related information" in the present disclosure. The data acquisition unit 320 is an example of the "information acquisition unit" in the present disclosure.

When the data of new lifetime-related information related to the replaced consumable is stored in the consumable lifetime-related information storage unit 330, the learning model creation unit 340 acquires the data of the newly stored lifetime-related information. In addition, the learning model creation unit 340 calls the learning model corresponding to the replaced consumable from the consumable learning model storage unit 350.

For example, when the replaced consumable is the laser chamber 100, the learning model creation unit 340 calls the file Am. When the replaced consumable is the monitor module 108, the learning model creation unit 340 calls the file Bm. When the replaced consumable is the line narrowing module 106, the learning model creation unit 340 calls the file Cm.

The learning model creation unit 340 performs machine learning based on the data of the lifetime-related parameter recorded during the period from the start of use to the replacement of the replaced consumable, and creates a new learning model. Specific details of the machine learning method will be described later. The new learning model created by the learning model creation unit 340 is stored in the consumable learning model storage unit 350. When a new learning model is created by performing machine learning, the file of the learning model storage unit 350 is updated, and the file of the latest learning model is written in the learning model storage unit 350.

5.2.2 Overview of Lifetime Prediction Operation of Consumables in Consumable Management Server Next, the operation of lifetime prediction of the consumable in the consumable management server 310 will be described. The data acquisition unit 320 can receive, from an external device, a request signal for lifetime prediction processing of the consumable scheduled to be replaced. Here, the external device may be the semiconductor factory management system 208 or a terminal device (not shown). The "consumable scheduled to be replaced" is a consumable that is currently mounted in the laser device 10 and is a candidate subject to be considered to be replaced in the future.

When the data acquisition unit 320 receives the request for the lifetime prediction processing of the consumable scheduled to be replaced, the data acquisition unit 111 acquires, from the laser device management system 206, the data of the current lifetime-related information of the consumable scheduled to be replaced and the data of the scheduled number of oscillation pulses per day Nday.

The data acquisition unit 111 transmits, to the consumable lifetime prediction unit 360, the data of the current lifetime-related information of the consumable scheduled to be replaced and the data of the scheduled number of oscillation pulses per day Nday.

The consumable lifetime prediction unit 360 acquires the data of the current lifetime-related information of the consumable scheduled to be replaced and the data of the scheduled number of oscillation pulses per day Nd, and calls the learning model corresponding to the consumable scheduled to be replaced from the consumable learning model storage unit 350.

For example, when the consumable scheduled to be replaced is the laser chamber 100, the lifetime prediction unit 360 reads the file Am from the consumable learning model storage unit 350.

The consumable lifetime prediction unit 360 predicts the lifetime of the consumable by using the learning model based on the data of the current lifetime-related information.

The consumable lifetime prediction unit 360 calculates the data of lifetime Nlife of the consumable scheduled to be replaced and a number of oscillation pulses of the remaining lifetime Nre, and a recommended maintenance date Drec, and transmits these data to the data output unit 370.

The recommended maintenance date Drec can be calculated, for example, using the following equation.

$$Drec = Dpre + Nre/Nday$$

Dpre: Date of acquisition of the current lifetime-related data of the consumable The data output unit 370 transmits, to the laser device management system 206 via the network 210, data of the predicted lifetime Nlife of the consumable scheduled to be replaced and the number of oscillation pulses of the remaining lifetime Nre, and the data representing the recommended maintenance date Drec. The data output unit 370 is an example of the "information output unit" in the present disclosure.

The laser device management system 206 may notify the semiconductor factory management system 208, an operator, the FSE, or the like of the information of the predicted lifetime Nlife of the consumable scheduled to be replaced, the number of oscillation pulses of the remaining lifetime Nre, and the recommended maintenance date Drec by a display, a mail, or the like.

The notification may be sent from the consumable management server 310 via the network 210.

5.2.3 Processing Example of Data Acquisition Unit

Figure 6:
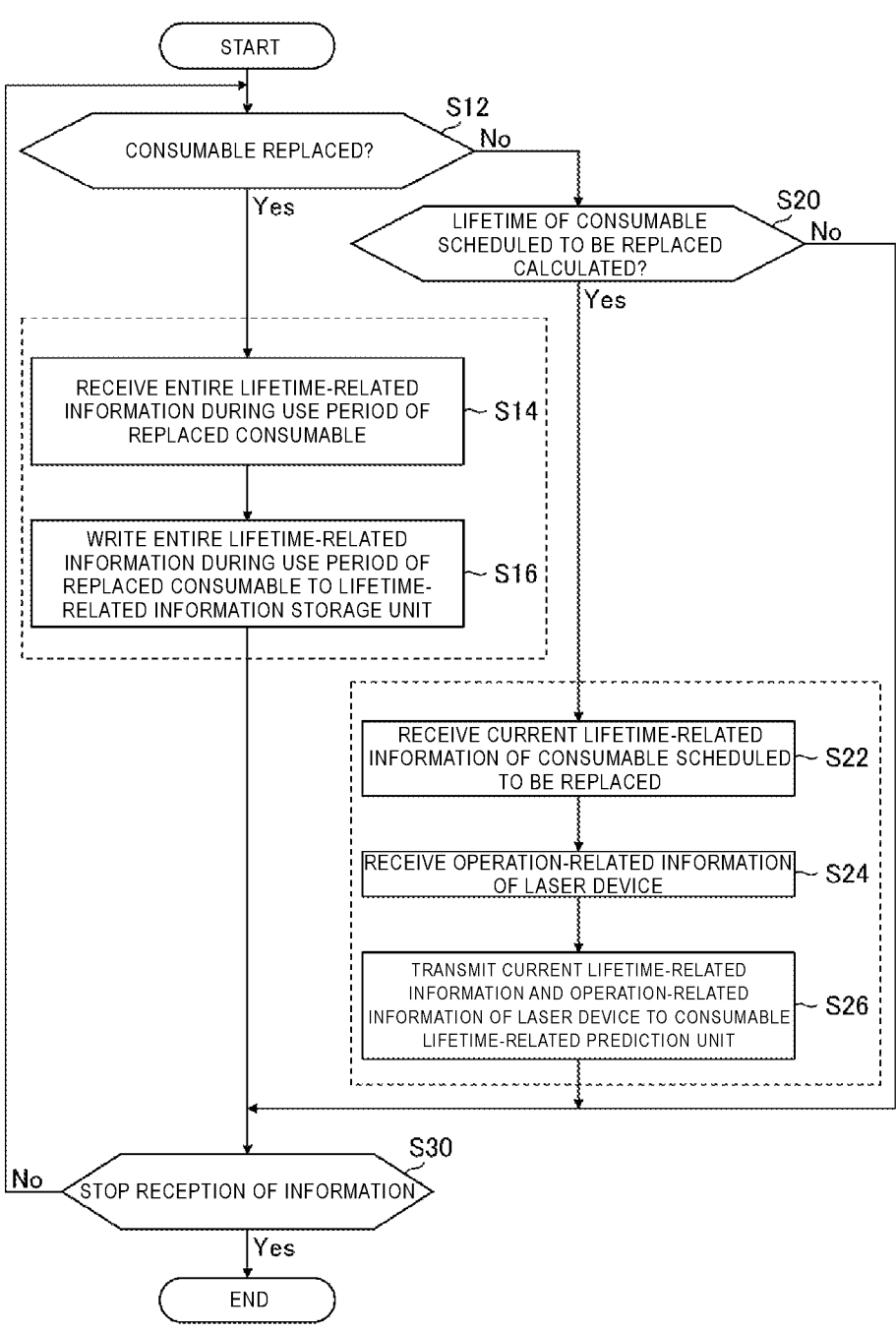
FIG. 6 is a flowchart showing an example of a processing content by a data acquisition unit.

FIG. 6 is a flowchart showing an example of a processing content by the data acquisition unit 320. The processing and operation shown in the flowchart of FIG. 6 are realized, for example, by a processor functioning as the data acquisition unit 320 executing a program.

In step S12, the data acquisition unit 320 determines whether or not a consumable has been replaced. When the determination result in step S12 is Yes, the data acquisition unit 320 proceeds to step S14. Step S14 and step S16 are processing flow for creating a learning model.

In step S14, the data acquisition unit 320 receives the entire lifetime-related information during the use period of the replaced consumable. That is, when the consumable of the laser device 10 is replaced, the data acquisition unit 320 receives, from the laser device management system 206, the entire lifetime-related information during the use period of the replaced consumable.

Next, in step S16, the data acquisition unit 320 writes the entire lifetime-related information during the use period of the replaced consumable into the consumable lifetime-related information storage unit 330. That is, the data acquisition unit 320 writes the data in a file corresponding to the replaced consumable. Here, the replaced consumable is the laser chamber 100, the monitor module 108, or the line narrowing module 106, and the data acquisition unit 320 writes the data to the file A, the file B, or the file C according to the type of the consumable.

After step S16, the data acquisition unit 320 proceeds to step S30. In step S30, the data acquisition unit 320 determines whether or not to stop the reception of information. When the determination result in step S30 is No, the data acquisition unit 320 returns to step S12.

When the determination result in step S12 is No, the data acquisition unit 320 proceeds to step S20. In step S20, the data acquisition unit 320 determines whether or not to calculate the lifetime of the consumable scheduled to be replaced. For example, when a user inputs a request to predict the lifetime of the consumable scheduled to be replaced from an input device (not shown), the determination result in step S20 is Yes.

When the determination result in step S20 is Yes, the data acquisition unit 320 proceeds to step S22. Step S22, step S24, and step S26 are processing flow in the case of calculating the predicted lifetime of the consumable scheduled to be replaced. Calculating the predicted lifetime of the consumable means to predict the lifetime of the consumable.

In step S22, the data acquisition unit 320 receives, from the laser device management system 206, the current lifetime-related information of the consumable scheduled to be replaced.

In step S24, the data acquisition unit 320 receives the operation-related information of the laser device 10 from the laser device management system 206. The operation-related data of the laser device 10 is the scheduled number of oscillation pulses Nday per day. Specifically, it may be the scheduled number of oscillation pulses Nday per day grasped from the past operation data. Alternatively, future operation schedule information may be acquired from the semiconductor factory management system 208 to calculate the scheduled number of oscillation pulses Nday per day.

Thereafter, in step S26, the data acquisition unit 320 transmits the current lifetime-related information and the operation-related information of the laser device 10 to the consumable lifetime prediction unit 360.

After step S26, the data acquisition unit 320 proceeds to step S30. Further, when the determination result in step S20 is No, the data acquisition unit 320 skips step S22 to step S26 and proceeds to step S30.

When the determination result in step S30 is Yes, the data acquisition unit 320 ends the flowchart of FIG. 6.

5.2.4 Processing Example of Learning Model Creation Unit

Figure 7:
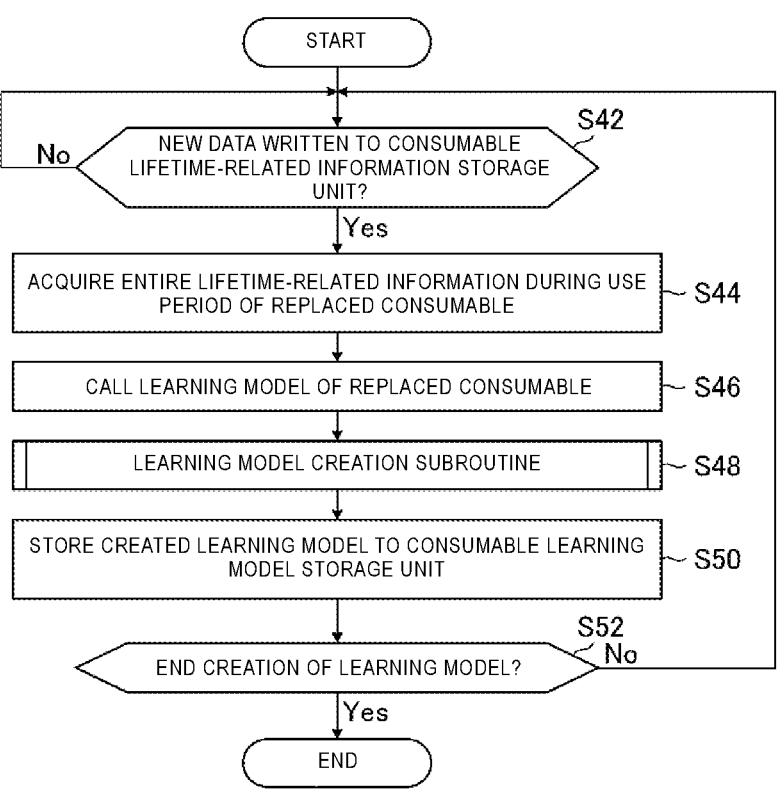
FIG. 7 is a flowchart showing an example of a processing content by a learning model creation unit.

FIG. 7 is a flowchart showing an example of a processing content by the learning model creation unit 340. The processing and operation shown in the flowchart of FIG. 7 are realized, for example, by a processor functioning as the learning model creation unit 340 executing a program.

In step S42, the learning model creation unit 340 determines whether or not new data has been written in the consumable lifetime-related information storage unit 330. When the determination result in step S42 is No, the learning model creation unit 340 repeats step S42. When the determination result in step S42 is Yes, the learning model creation unit 340 proceeds to step S44.

In step S44, the learning model creation unit 340 acquires the entire lifetime-related information during the use period of the replaced consumable. The learning model creation unit 340 acquires the data written in the file (the file A, the file B, or the file C) corresponding to the replaced consumable (the laser chamber 100, the monitor module 108, or the line narrowing module 106).

In step S46, the learning model creation unit 340 calls the learning model of the replaced consumable. That is, the learning model creation unit 340 calls the learning model stored in the file (the file Am, the file Bm, or the file Cm) corresponding to the replaced consumable.

In step S48, the learning model creation unit 340 executes a process of a learning model creation subroutine. The learning model creation unit 340 performs machine learning based on the learning model corresponding to the replaced consumable and the lifetime-related information, and creates a new learning model.

In step S50, the learning model creation unit 340 stores the newly created learning model in the consumable learning model storage unit 350. The learning model creation unit 340 stores the newly created learning model in the file (the file Am, the file Bm, or the file Cm) corresponding to the replaced consumable. The latest learning model is stored in the learning model storage unit 350 so as to use the new learning model from the next time.

In step S52, the learning model creation unit 340 determines whether or not to stop the creation of the learning model. When the determination result in step S52 is No, the learning model creation unit 340 returns to step S42 and repeats step S42 to step S52. When the determination result in step S52 is Yes, the learning model creation unit 340 ends the flowchart of FIG. 7.

Here, in the flowchart of FIG. 7, when the learning model of each consumable is created for the first time, the parameters of each initial learning model stored in the learning model storage unit 350 may be set to an arbitrary value before learning. By performing machine learning described later, the parameters of the learning model are changed to appropriate values, and a learning model in which the processing function of predicting the lifetime of the consumable is obtained is created.

Naturally, the initial learning model may be a provisional learning model in which parameters are adjusted to some extent by performing a method similar to the machine learning method of the present embodiment in advance.

5.2.5 Creation Example 1 of Learning Model Used for Lifetime Prediction of Laser Chamber The learning model created by the learning model creation unit 340 learns so as to receive an input of the lifetime-related information and output the deterioration degree of the consumable as a prediction (inference) result. The process performed by the learning model creation unit 340 includes a process of creating training data used for the machine learning and a process of performing machine learning using the created training data. First, an example of a training data creation method performed by the learning model creation unit 340 will be described. Here, the training data is synonymous with "data for learning" or "learning data."

Figure 8:
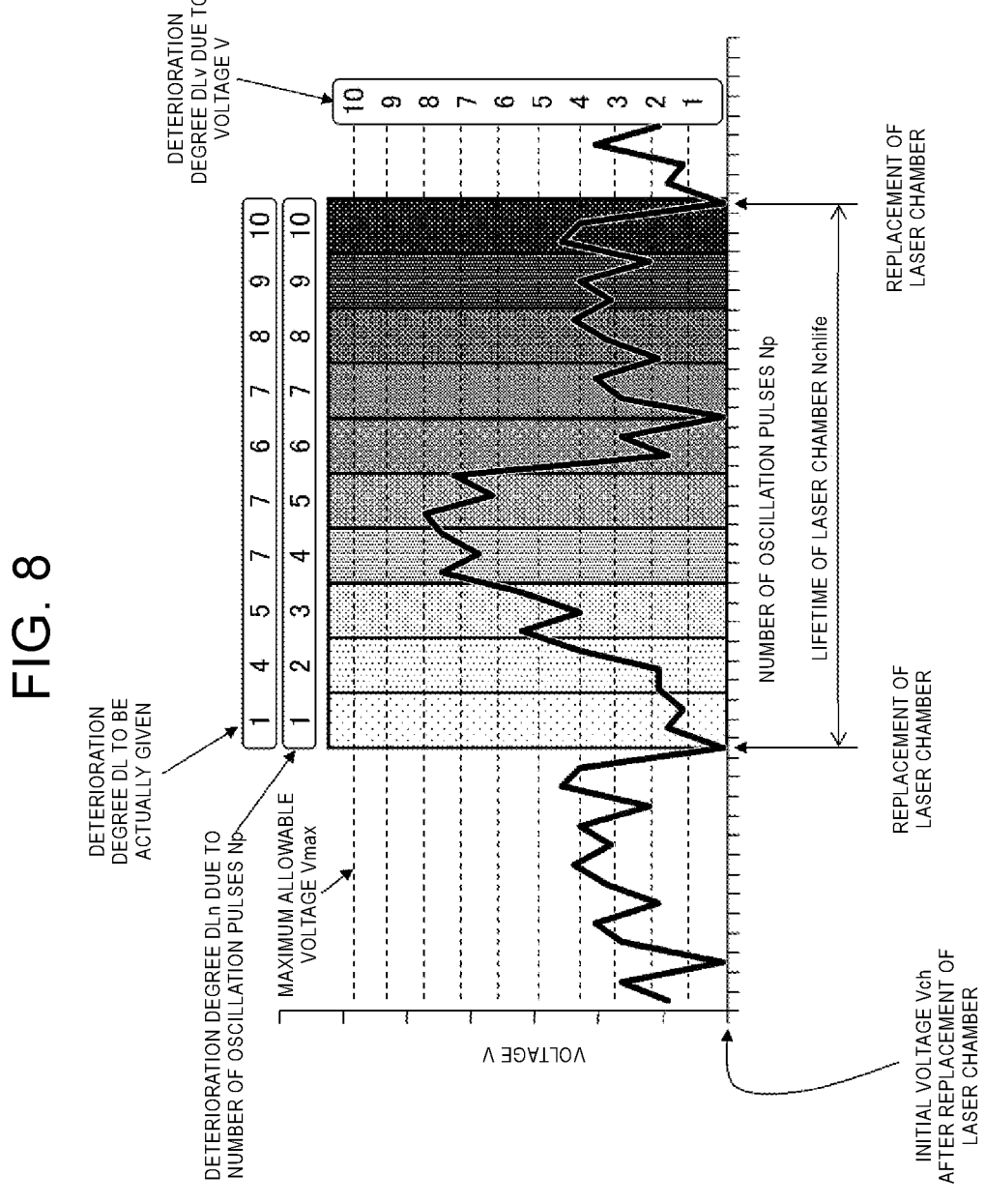
FIG. 8 is a graph showing an example of the relationship between a voltage and the number of oscillation pulses for the laser chamber, and shows an example in which a deterioration degree up to the lifetime of the laser chamber is given based on the number of oscillation pulses and the voltage.

FIG. 8 is a graph showing an example of the relationship between a voltage V for the laser chamber 100 and the number of oscillation pulses Np, and shows an example in which the deterioration degree up to the lifetime of the laser chamber 100 is given by the number of oscillation pulses Np and the voltage V. In FIG. 8, the horizontal axis represents the number of oscillation pulses Np, and the vertical axis represents the voltage V applied between the electrodes 125, 126. The data of the voltage V associated with the number of oscillation pulses Np as shown in FIG. 8 can be read out from the lifetime-related log data of the laser chamber 100 stored in the file A.

One cycle of consumable replacement is defined as the lifetime of each consumable, and a deterioration degree DLn due to the number of oscillation pulses Np is defined in levels (e.g., 10 levels). The deterioration degree DLn is obtained by evaluating the level of deterioration of the laser chamber 100 by the number of oscillation pulses Np, and a value indicating the level of the deterioration degree DLn increases as the number of oscillation pulses Np increases. The higher the level of the deterioration degree DLn is, that is, the higher the value indicating the level of the deterioration degree DLn is, the more the deterioration is advanced. When 10 levels of the deterioration degree DLn are defined in accordance with the number of oscillation pulses Np, the minimum level value may be 1 and the maximum level value may be 10.

Here, the voltage V applied between the electrodes 125, 126 tends to gradually increase in order to compensate for a decrease in energy caused by an increase in the impurity concentration of the gas. Therefore, a maximum allowable voltage Vmax is defined as the lifetime, and a deterioration degree DLv by the voltage V is defined in levels (e.g., 10 levels). The maximum allowable voltage Vmax is, for example, a value in the range of 17.5 kV to 20.0 kV. The deterioration degree DLv is obtained by evaluating the level of deterioration of the laser chamber 100 by the voltage V, and a value indicating the level of the deterioration degree DLv increases as the voltage V increases. When 10 levels of the deterioration degree DLn are defined in accordance with the voltage V, the minimum level value may be 1 and the maximum level value may be 10. The upper limit (maximum level value) of the deterioration degree DLv due to the voltage V and the upper limit of the deterioration degree DLn due to the number of oscillation pulses Np are prefer-ably set equal to each other, and the relative states of deterioration with respect to the upper limits of the deterioration degrees due to the respective parameters are prefer-ably substantially equal to each other. As for the level division of the deterioration degree DLv due to the voltage V, the correspondence relationship between the voltage value and the level value may be determined in advance from the test result, the field data, or the like.

With respect to the state of the laser chamber 100 represented by a combination (Np, V) of the parameters of the number of oscillation pulses Np and the voltage V, the deterioration degree DL to be actually given as a label indicating the degree of deterioration up to the lifetime is defined as the deterioration degree of the higher deteriora-tion level (the higher level value) among a deterioration degree DLn(Np) due to the number of oscillation pulses Np and a deterioration degree DLv (V) due to the voltage V. According to the example of FIG. 8, for example, in a region where the level of the deterioration degree DLn due to the number of oscillation pulses Np is "2", since the level of the deterioration degree DLv due to the voltage V is "4", the deterioration degree DL actually given to the region is "4." Here, since the voltage V may have a large variation at the time of acquisition, a moving average value for a certain period (e.g., one week) may be used.

Figure 9:
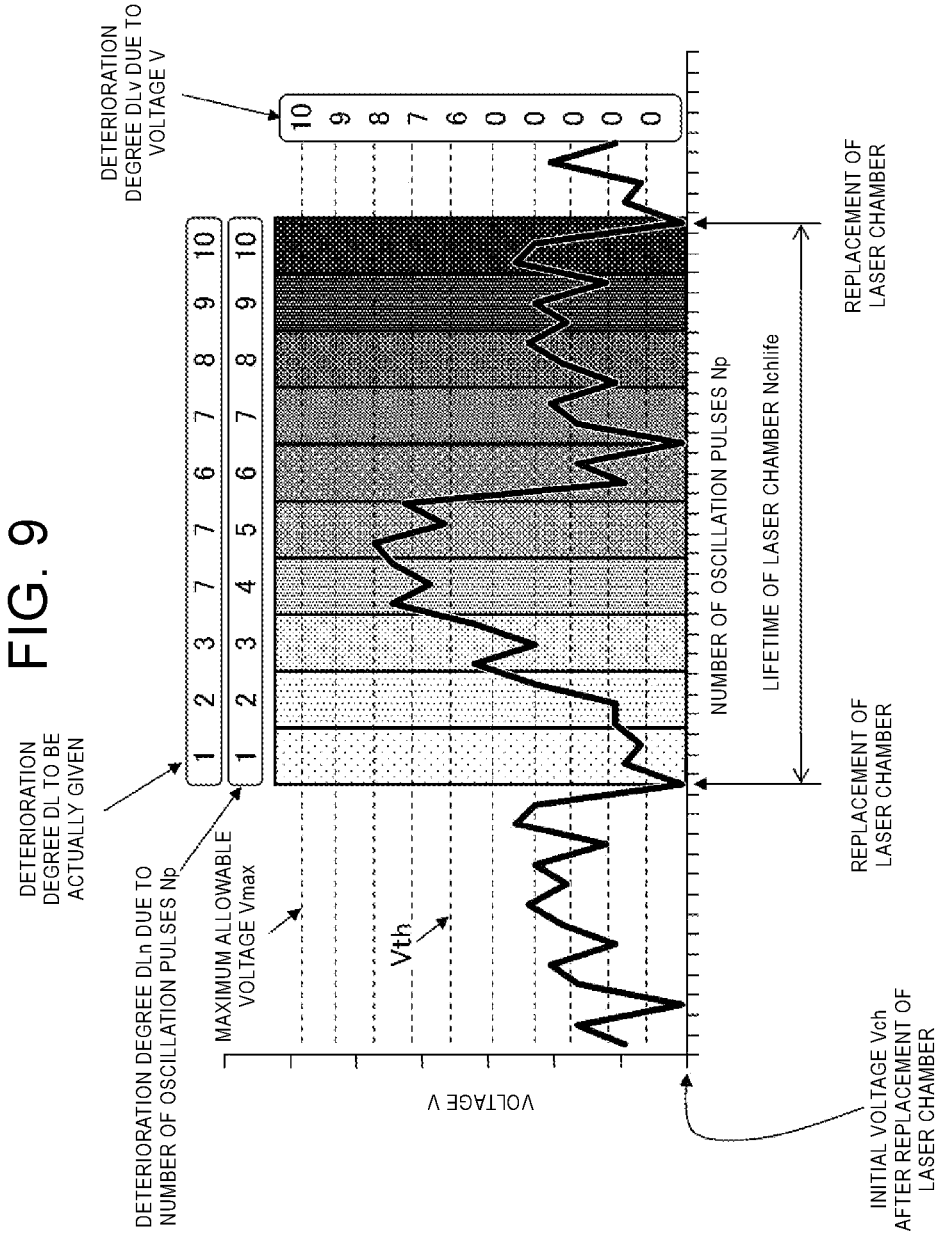
FIG. 9 is a graph showing an example of the relationship between the voltage and the number of oscillation pulses for the laser chamber, and shows another example in which a degradation degree up to the lifetime of the laser chamber is given based on the number of oscillation pulses and the voltage.

In FIG. 8, for defining the deterioration degree DLv by the data of the voltage V, although the range from the initial voltage Vch after the replacement of the laser chamber 100 to the maximum allowable voltage Vmax is equally divided into 10 levels as levels 1 to 10, the level division of the deterioration degree DLv by the voltage V is not limited to this example. For example, as shown in FIG. 9, a threshold voltage Vth may be determined with respect to the voltage V, the deterioration degree DLv at the threshold voltage Vth may be determined as level 6 or the like, and levels 6 to 10 may be set by equally dividing the range from the threshold voltage Vth to the maximal allowable voltage Vmax. When the maximum allowable voltage Vmax is, for example, 19 kV, the threshold voltage Vth may be, for example, 17.5 kV. In this case, the deterioration degree DLv due to a low voltage V less than the threshold voltage Vth may be set to level 0. Level 0 means that the deterioration degree is not evaluated (no evaluation). The threshold voltage Vth is an example of the "predetermined threshold value" in the present disclosure.

According to FIG. 9, for example, since the value of the voltage V in the region where the level of the deterioration degree DLn due to the number of oscillation pulses Np is "3" is lower than the threshold voltage Vth, the level of the deterioration degree DLv due to the voltage V in this region is "0." Therefore, the evaluation of the deterioration degree DLn due to the number of oscillation pulses Np is priori-tized, and the deterioration degree DL actually applied to the region is "3." On the other hand, in a region where the level of the deterioration degree DLn due to the number of oscillation pulses Np is "4", since the level of the deterio-ration degree DLv due to the voltage V is "7", the deterio-ration degree DL actually given to the region is "7" which is the larger value.

According to such setting of the deterioration degree, when the voltage V is lower than the threshold voltage Vth, the deterioration degree DLn due to the number of oscilla-tion pulses Np is maintained as the deterioration degree DL to be actually applied. On the other hand, when the voltage V is equal to or higher than the threshold voltage Vth, the deterioration degree DLv due to the voltage V is evaluated as the level value of the second half (level 6 to 10) of the deterioration levels.

With regard to the voltage V, from the knowledge that the deterioration state causes a problem when the voltage becomes higher than a certain voltage value, it is possible to adopt a configuration in which a label of the deterioration degree DLv due to the voltage V is given to a region the voltage of which is higher than a value (threshold voltage Vth) of the voltage V to which attention should be paid.

By adopting the method of giving the deterioration degree as shown in FIG. 9, in a region where the voltage V is lower than the threshold voltage Vth, the influence of the evalu-ation of the deterioration degree DLn due to the number of oscillation pulses Np can be relatively increased while relatively reducing the influence of the evaluation of the deterioration degree DLv due to the voltage V. In a region where the voltage V is higher than the threshold voltage Vth, the evaluation of the deterioration degree DLv due to the voltage V and the evaluation of the deterioration degree DLn due to the number of oscillation pulses Np can be compared with each other with substantially the same degree of importance, and the deterioration degree DL to be actually given can be determined. In this case, the deterioration degree DL to be actually given is the deterioration degree of the higher deterioration level among the deterioration degrees due to the two parameters.

In FIG. 9, the deterioration degree DLv due to the lower voltage V that is less than the threshold voltage Vth is defined as "level 0", but the same result can be obtained even if the deterioration degree is defined as "level 1" instead of "level 0." That is, the deterioration degree DLv due to the voltage V when the voltage V is lower than the threshold voltage Vth may be a value equal to or less than the minimum level value (level 1) of the deterioration degree DLn due to the number of oscillation pulses Np.

As shown in FIG. 8 or FIG. 9, the deterioration degree DL is given with respect to the combination (Np, V) of the number of oscillation pulses Np and the voltage V. The thus created data in which the parameter set of the combination (Np, V) of the number of oscillation pulses Np and the voltage V and the deterioration degree DL are associated with each other is used as the training data for machine learning.

That is, the combined data of the number of oscillation pulses Np and the lifetime-related parameter becomes the input data to the learning model, and the value of the level representing the deterioration degree DL corresponds to the label (teacher data) of the correct answer of the deterioration degree with respect to the input data.

In the case of the example shown in FIG. 8, the data of the parameter set of the combination (Np, V) of the number of oscillation pulses Np and the voltage V is the input data to the learning model, and the data of the deterioration degree DL corresponding thereto is the label of the correct answer. The learning model creation unit 340 performs machine learning using the created supervised data, and creates a learning model for outputting a predicted deterioration degree with respect to the input of the combination of the number of oscillation pulses Np and the voltage V. That is, the learning model creation unit 340 creates a learning model that performs a task of 10 class classifications for predicting (inferring) a corresponding level among 10 levels of deterioration degrees (levels 1 to 10) with respect to the input data obtained by combining a plurality of parameters. Here, although an example in which the deterioration degree of 10 levels is defined is shown, the number of levels of the deterioration degree is not limited to 10 levels, and may be two or more levels as appropriate.

The deterioration degree DLn due to the number of oscillation pulses Np is an example of the "first deterioration degree" in the present disclosure. The deterioration degree DLv due to the voltage V is an example of the "second deterioration degree" in the present disclosure. The deterioration degree DL to be actually given is an example of the "third deterioration degree" in the present disclosure.

5.2.6 Creation Example 2 of Learning Model Used for Lifetime Prediction of Laser Chamber In FIGS. 8 and 9, the example in which the deterioration degree DL is given based on the number of oscillation pulses Np and the voltage V has been described, but the parameters used for evaluating the lifetime of the laser chamber 100 are not limited to the number of oscillation pulses Np and the voltage V. As described with reference to FIG. 3, similarly to the voltage V (see FIG. 3), the initial gas pressure Pini after the total gas replacement also increases as the number of oscillation pulses Np increases. Hereinafter, the initial gas pressure Pini after the total gas replacement will be referred to as the "gas pressure Pini." Therefore, a deterioration degree DLp may be determined due to the gas pressure Pini instead of the deterioration degree DLv due to the voltage V.

Further, it is more preferable to determine the deterioration degree using both the voltage V and the gas pressure Pini. In this case, the deterioration degree DL to be actually given may be the deterioration degree having the largest value among the deterioration degree DLn due to the number of oscillation pulses Np, the deterioration degree DLv due to the voltage V, and the deterioration degree DLp due to the gas pressure Pini. Here, similarly to the voltage V, since the gas pressure Pini may have a large variation at the time of acquisition, a moving average value for a certain period (e.g., one week) may be used.

Figure 10:
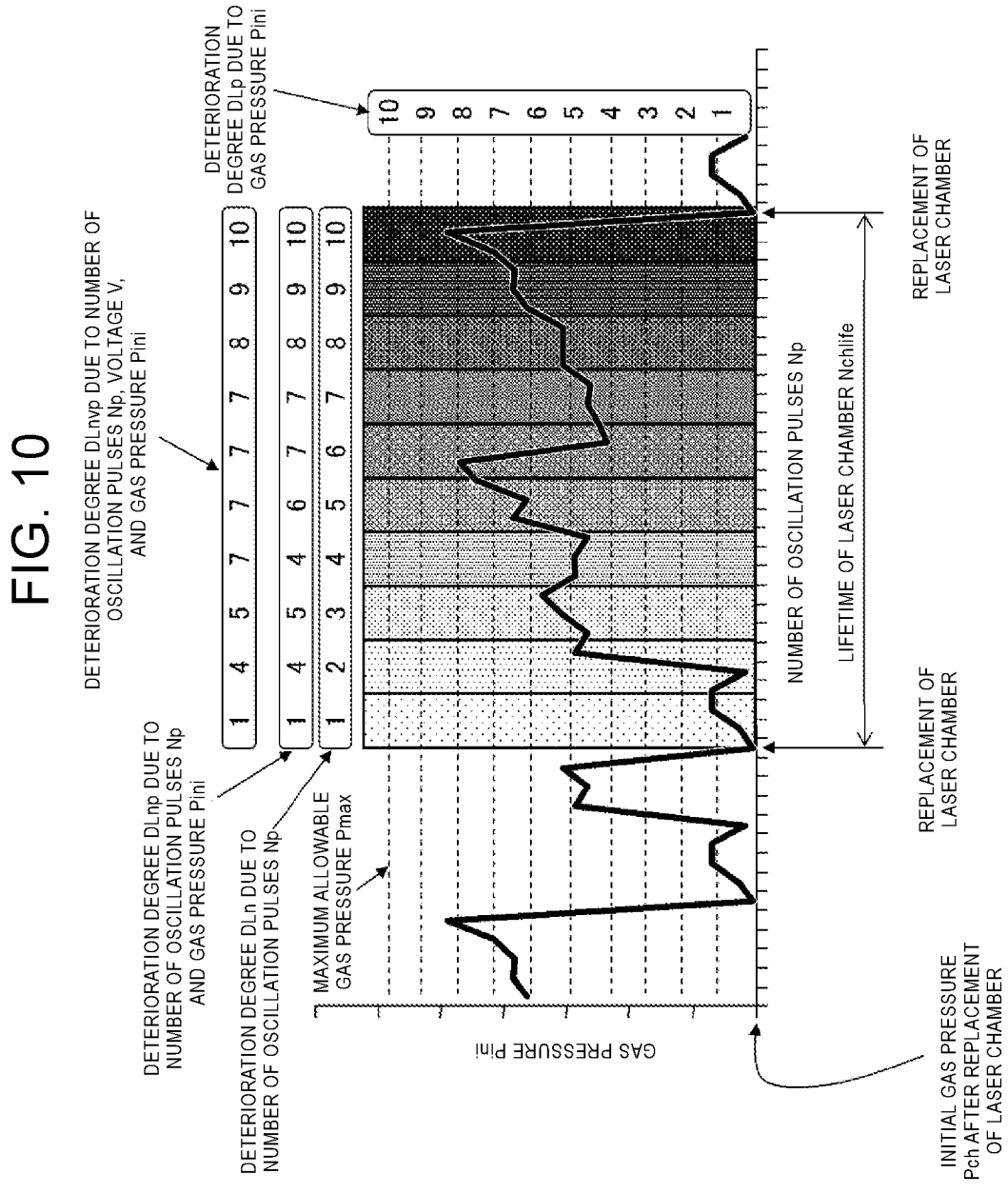
FIG. 10 is a graph showing an example of the relationship between a gas pressure and the number of oscillation pulses for the laser chamber, and shows an example in which a degradation degree up to the lifetime of the laser chamber is given based on the number of oscillation pulses, the gas pressure, and the voltage.

FIG. 10 is a graph showing an example of the relationship between the gas pressure Pini and the number of oscillation pulses Np for the laser chamber 100, and shows an example in which the deterioration degree up to the lifetime of the laser chamber 100 is given based on the number of oscillation pulses Np, the gas pressure Pini, and the voltage V. In FIG. 10, the vertical axis represents the gas pressure Pini, and the unit is [Pa]. A maximum allowable gas pressure Pmax is defined as the lifetime, and a deterioration degree DLp due to the gas pressure Pini is defined in levels (e.g., 10 levels).

In FIG. 10, regarding the definition of the deterioration degree DLp due to the gas pressure Pini, the range from the initial gas pressure Pch after replacement of the laser chamber 100 to the maximum allowable gas pressure Pmax is equally divided into 10 levels of levels 1 to 10, but the setting of the level division of the deterioration degree DLp due to the gas pressure Pini is not limited to this example.

For example, a threshold gas pressure that becomes a threshold value with respect to the gas pressure Pini may be determined, and the deterioration degree at the threshold gas pressure may be set to, for example, level 3, and levels 3 to 10 may be set by equally dividing up to the level 10 of the maximum allowable gas pressure Pmax. For example, if Pmax is 3300 [Pa], the threshold gas pressure may be 2400 [Pa]. In this case, the deterioration degree corresponding to the gas pressure lower than level 3 may be level 0 or level 1.

The deterioration degree DLnp due to the combination (Np, Pini) of the parameters of the number of oscillation pulses Np and the gas pressure Pini is the deterioration degree having the higher deterioration level among the deterioration degree DLn(Np) due to the number of oscillation pulses Np and the deterioration degree DLp(Pini) due to the gas pressure Pini.

Further, in the case in which the deterioration degree is determined by using both the voltage V and the gas pressure Pini, the deterioration degree DLnvp to be actually applied with respect to the combination (Np, V, Pini) of the number of oscillation pulses Np, the voltage V, and the gas pressure P is the deterioration degree having the highest deterioration level among the deterioration degree DLn(Np) due to the number of oscillation pulses Np, the deterioration degree DLv(V) due to the voltage V, and the deterioration degree DLp(Pini) due to the gas pressure Pini.

According to the example of FIG. 10, in a region where the level of the deterioration degree DLn due to the number of oscillation pulses Np is "5", since the level of the deterioration degree DLp due to the gas pressure Pini is "6", the deterioration degree DLn due to a comprehensive determination of the number of oscillation pulses and the gas pressure Pini is "6." Further, in the region where the level of the deterioration degree DLn due to the number of oscillation pulses Np is "5" in FIG. 10, since the level of the deterioration degree DLp due to the voltage V is "7" (see FIG. 8), the deterioration degree DLnvp due to a comprehensive determination of the number of oscillation pulses, the voltage V, and the gas pressure Pini is "7."

As shown in FIG. 10, the deterioration degree DLnvp is given to the state of the consumable represented by the combination (Np, V, Pini) of the number of oscillation pulses Np, the voltage V, and the gas pressure Pini based on the deterioration degrees DLn, DLv, DLp due to the respective parameters. The thus created data in which the combination (Np, V, Pini) of the number of oscillation pulses Np, the voltage V, and the gas pressure P and the deterioration degree DLnvp are associated with each other is used as the training data for machine learning.

Machine learning is performed using such training data, and a learning model is created in which a level indicating the deterioration degree of a consumable (i.e., a class classification label of the deterioration degree) is output as a prediction result with respect to an input of the combination (Np, V, Pini) of the number of oscillation pulses Np, the voltage V, and the gas pressure P. The voltage V and gas pressure Pini are examples of the "plurality of lifetime-related parameters" in the present disclosure. Each of the deterioration degree DLv due to the voltage V and the deterioration degree DLp due to the gas pressure Pini is an example of the "second deterioration degree" in the present disclosure. The comprehensive deterioration degree DLnvp due to the number of oscillation pulses Np, the voltage V, and the gas pressure Pini is an example of the "third deterioration degree" in the present disclosure.

Not only for the laser chamber 100 but also for other consumables such as the monitor module 108 and the line narrowing module 106, the data of the lifetime-related information over the entire period of one cycle from the start of use to the replacement of the consumable is divided into a plurality of levels of the deterioration degree for each consumable, and training data in which the data of the lifetime-related parameter and the level indicating the deterioration degree are associated with each other is created.

Then, for each type of consumable, machine learning is performed using the respective training data, and a respective learning model is created.

Figure 11:
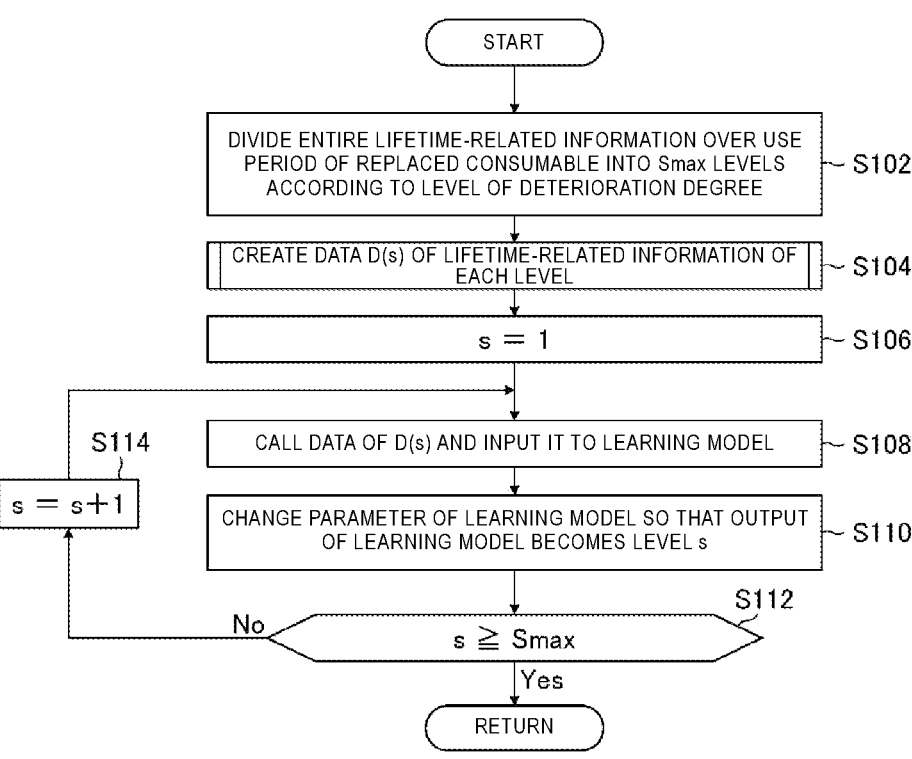
FIG. 11 is a flowchart showing example 1 of a processing content applied to step S48 of FIG. 7.

FIG. 11 is a flowchart showing example 1 of a processing content applied to step S48 in FIG. 7. That is, FIG. 11 shows example 1 of the learning model creation subroutine.

In step S102 of FIG. 11, the learning model creation unit 340 divides the entire lifetime-related information over the use period of the replaced consumable into Smax levels according to the level of the deterioration degree. Smax may be, for example, 10 as shown in FIG. 8.

In step S104, the learning model creation unit 340 creates data D(s) of the lifetime-related information of each level divided into Smax levels. Here, s is an integer representing the level of the deterioration degree. Here, s can range from 1 to Smax. In the example of FIG. 8, the data D(s) of the lifetime-related information of each level of the deterioration degree DL classified into 10 levels with respect to the laser chamber 100 is created. The data D(s) is data in which the lifetime-related information and the level s of the deterioration degree DL are associated with each other, and is used as training data. The method of creating the training data as performing step S102 and step S104 is an example of the "training data creation method" in the present disclosure.

Next, in step S106, the learning model creation unit 340 sets the value of the variable s representing the level of the deterioration degree to "1" as the initial value. Thereafter, in step S108, the learning model creation unit 340 inputs the data D(s) to the learning model called in step S46 of FIG. 7.

Next, in step S110 of FIG. 11, the learning model creation unit 340 changes the parameters of the learning model so that the output of the learning model with respect to the input of the data D(s) becomes the level s.

The learning model may be, for example, a neural network model. The learning model creation unit 340 changes the parameters of the learning model by machine learning using supervised data, and creates a new learning model.

In step S112, the learning model creation unit 340 determines whether or not the variable s is equal to or more than Smax. When the determination result in step S112 is No, the learning model creation unit 340 proceeds to step S114, increments the value of the variable s, and returns to step S108. When the determination result in step S112 is Yes, the learning model creation unit 340 ends the flowchart of FIG. 11 and returns to the flowchart of FIG. 7. That is, when the determination result in step S112 becomes Yes, the learning model is updated to a new learning model in which the result of the consumable that has been replaced this time is reflected.

In the processing of steps S106 to S112 of FIG. 11, an example in which learning is performed for each level of the deterioration degree has been described, but it is preferable that the learning unit is not for each level but for each arbitrary number of random samples (e.g., 1000 samples) with respect to the input of the training data to the learning model. When learning is performed for each level, there is a possibility that the internal parameters of the learning model may be deviated to the data of the last learned level, and therefore, it is preferable to randomly sample the learning data group serving as the learning unit if possible.

The learning model creation unit 340 is an example of a processing unit that performs the "training data creation method" and the "machine learning method" in the present disclosure.

Figure 12:
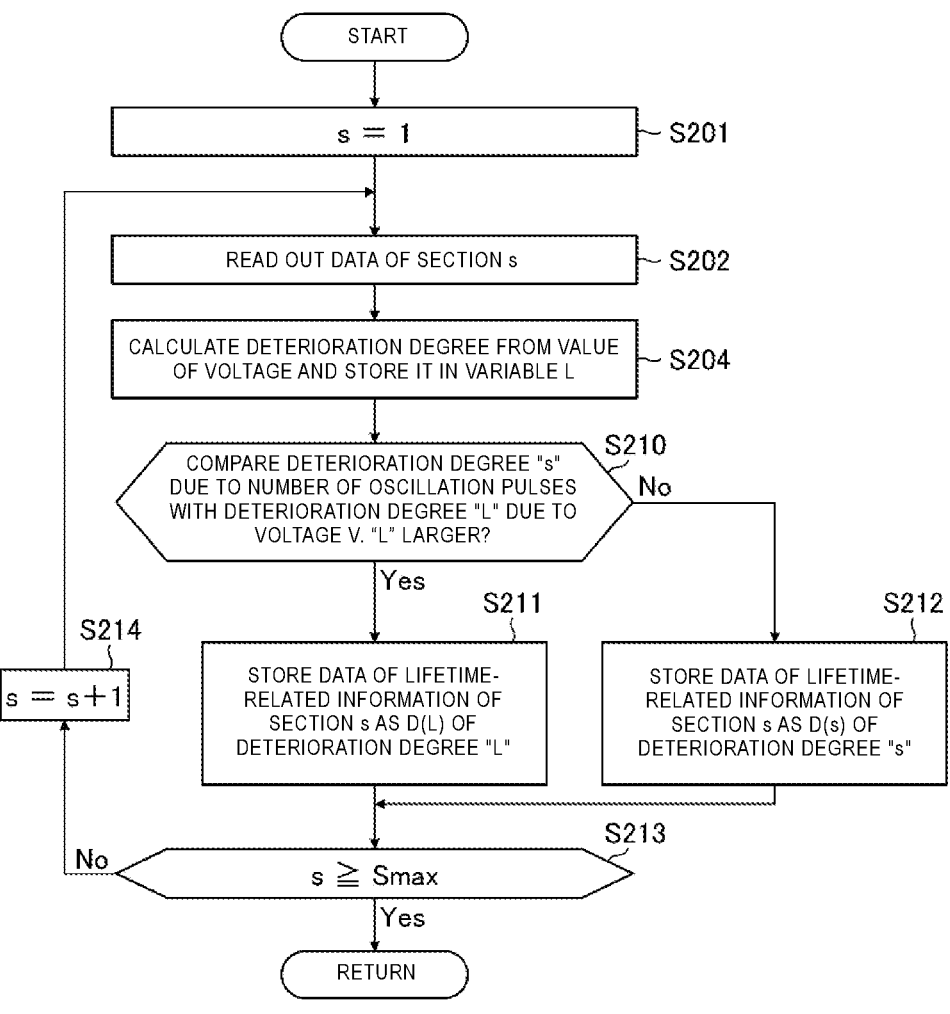
FIG. 12 is a flowchart showing example 1 of a processing content applied to step S104 of FIG. 11.

FIG. 12 is a flowchart showing example 1 of a processing content applied to step S104 of FIG. 11. As shown in FIGS. 8 and 9, the flowchart of FIG. 12 is an example of the "process of creating the data D(s) of the lifetime-related information at each level" when the deterioration degree DLn due to the number of oscillation pulses Np is rewritten (overwritten) in consideration of the deterioration degree DLv due to the voltage V.

In step S201, the learning model creation unit 340 sets the value of the variable s to "1" as the initial value. Here, the variable s here represents a section defined by dividing the number of oscillation pulses Np into Smax levels, and corresponds to the level of the deterioration degree DLn due to the number of oscillation pulses Np.

In step S202, the learning model creation unit 340 reads out the data of the section s. Here, the data of the voltage V in the section s is read out.

In step S204, the learning model creation unit 340 calculates the deterioration degree DLv from the value of the voltage V and stores the deterioration degree DLv in a variable L. For example, when the value of the voltage V is 19 kV, the deterioration degree DLv is calculated as "6" (see FIG. 8).

Next, in step S210, the learning model creation unit 340 compares the deterioration degree "s" due to the number of oscillation pulses Np with the deterioration degree "L" due to the voltage V, and determines whether or not "L" is larger than "s."

When the determination result in step S210 is Yes (L>s), the learning model creation unit 340 proceeds to step S211. In step S211, the learning model creation unit 340 stores data of the lifetime-related information of the section s as D(L) of the deterioration degree "L."

On the other hand, when the determination result in step S210 is No (L≤s), the learning model creation unit 340 proceeds to step S212. In step S212, the learning model creation unit 340 stores data of the lifetime-related information of the section s as D(s) of the deterioration degree "s."

After step S211 or S212, the learning model creation unit 340 proceeds to step S213.

In step S213, the learning model creation unit 340 determines whether or not the variable s is equal to or more than Smax. When the determination result in step S112 is No, the learning model creation unit 340 proceeds to step S214, increments the value of the variable s, and returns to step S202. When the determination result in step S213 is Yes, the learning model creation unit 340 ends the flowchart of FIG. 12 and returns to the flowchart of FIG. 11.

Figure 13:
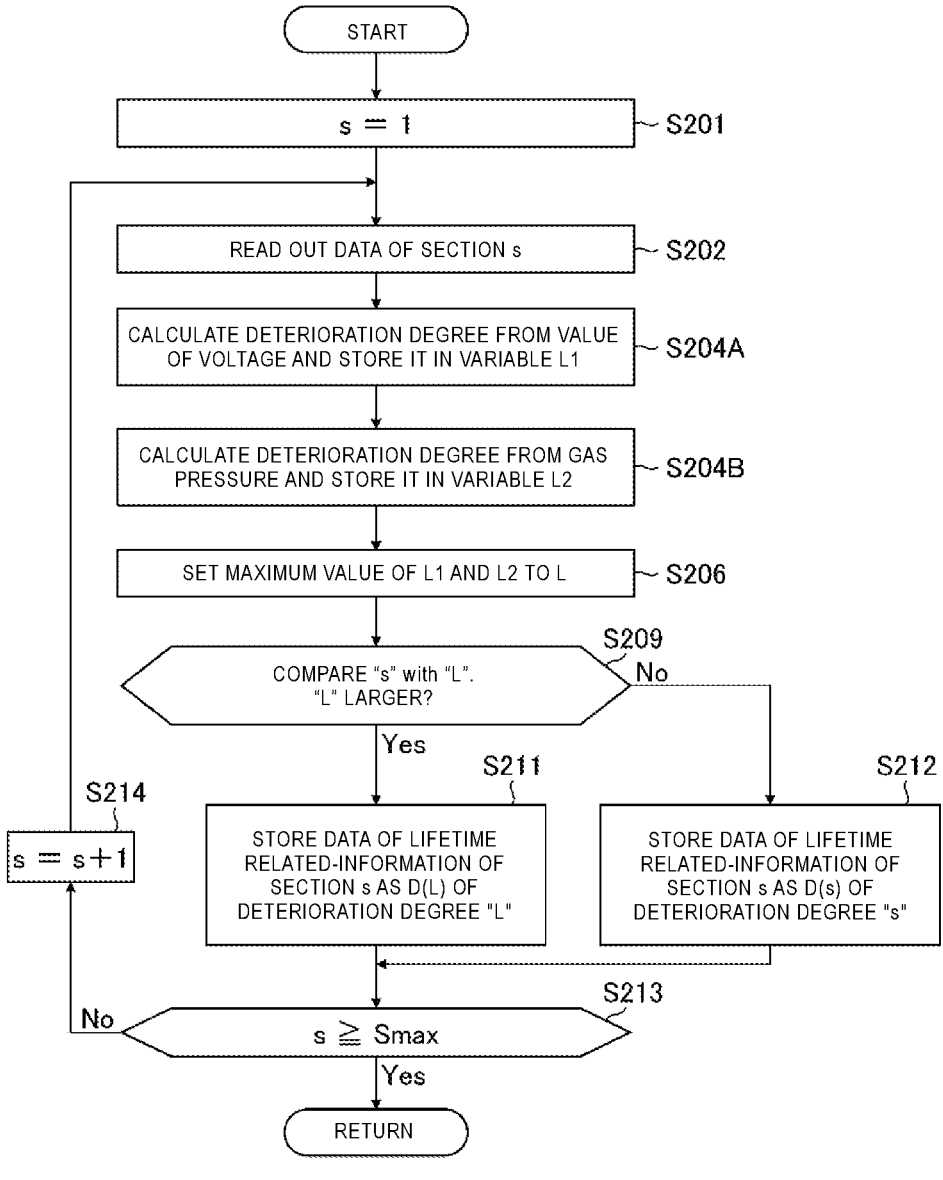
FIG. 13 is a flowchart showing example 2 of a processing content applied to step S104 of FIG. 11.

FIG. 13 is a flowchart showing example 2 of a processing content applied to step S104 of FIG. 11. The flowchart of FIG. 13 is an example of the "process of creating the data D(s) of the lifetime-related information at each level" when the deterioration degree DLn due to the number of oscillation pulses Np is rewritten in consideration of the deterioration degree DLv due to the voltage V and the deterioration degree DLp due to the gas pressure Pini. In FIG. 13, steps having common processing to FIG. 12 are denoted with same step numbers, and duplicate description thereof will be omitted.

After step S202, in step S204A, the learning model creation unit 340 calculates the deterioration degree DLv from the value of the voltage V and stores the deterioration degree DLv in a variable L1.

In step S204B, the learning model creation unit 340 calculates the deterioration degree DLp from the gas pressure Pini and stores the deterioration degree DLp in a variable L2.

In step S206, the learning model creation unit 340 sets the maximum value of L1 and L2 to L.

In step S209, the learning model creation unit 340 compares "s" with "L" to determine whether or not "L" is larger.

When the determination result in step S209 is Yes (L>s), the learning model creation unit 340 proceeds to step S211. For example, when s=1 and L=6, the determination result in step S210 is Yes, and the process proceeds to step S211. On the other hand, when the determination result in step S209 is No (L≤s), the learning model creation unit 340 proceeds to step S212. Subsequent steps S211 to S214 are similar to those in FIG. 12.

Figure 14:
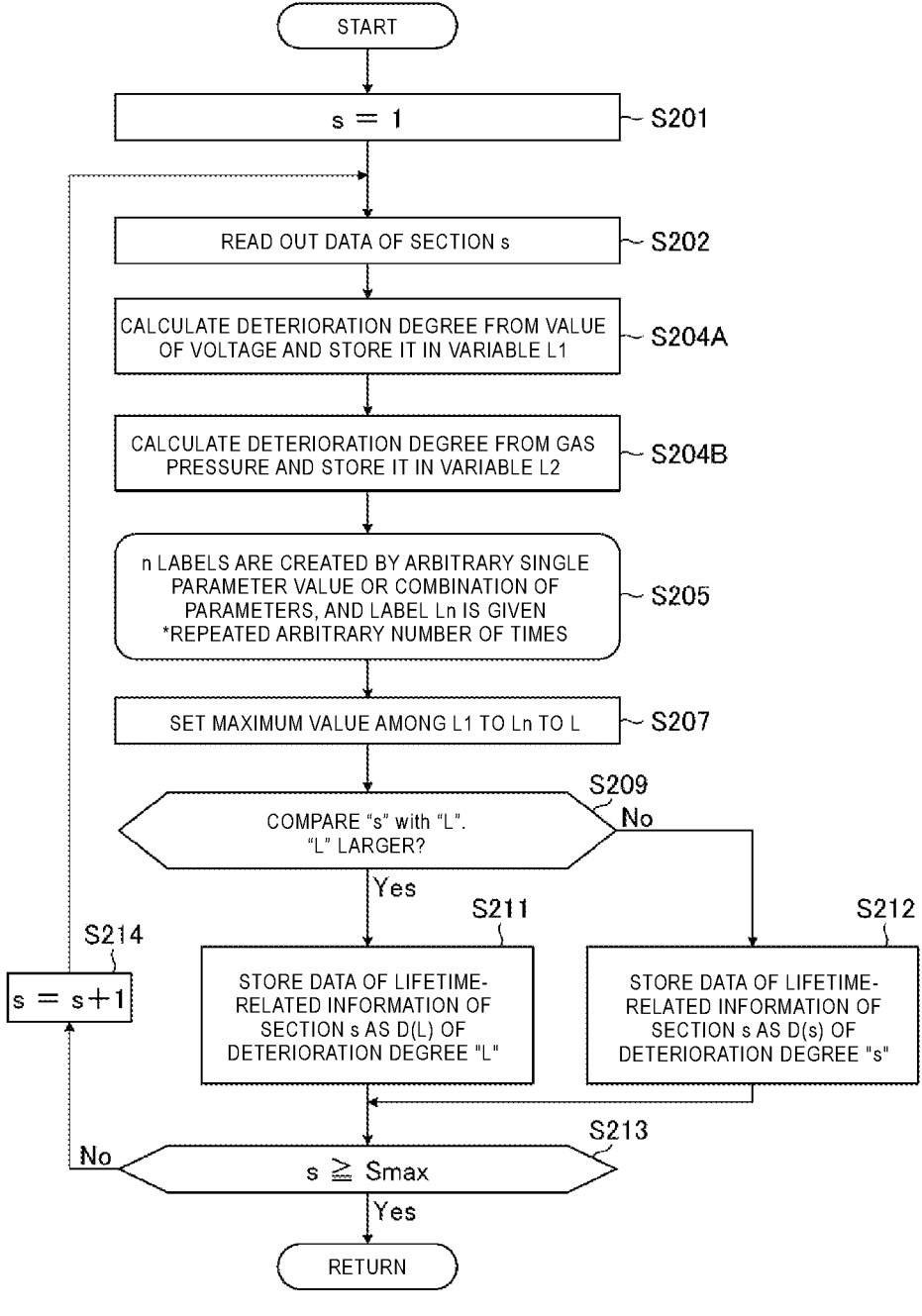
FIG. 14 is a flowchart showing example 3 of a processing content applied to step S104 of FIG. 11.

FIG. 14 is a flowchart showing example 3 of a processing content applied to step S104 of FIG. 11. The flowchart of FIG. 14 is an example of the "process of creating the data D(s) of the lifetime-related information at each level" when the deterioration degree DLn due to the number of oscillation pulses Np is rewritten in consideration of n deterioration parameters in total including the voltage V and the gas pressure Pini. In FIG. 14, steps having common processing to FIG. 13 are denoted with same step numbers, and duplicate description thereof will be omitted.

In step S205 after step S204B of FIG. 14, n labels are created by an arbitrary single parameter value or combination of parameters, and a label Ln is given. The process of step S205 is repeated an arbitrary number of times in accordance with the number of types of the single parameter or the combination of parameters for evaluating the deterioration degree. Here, step S204A and step S204B may be performed in step S205. Each of the voltage V and the gas pressure Pini is an example of the single parameter for evaluating the deterioration degree.

After step S205, in step S207, the learning model creation unit 340 sets the maximum value among L1 to Ln to L. The subsequent steps S209 and S211 to 214 are similar to those in FIG. 13.

5.2.7 Example of Combining a Plurality of Parameters to be Converted into One Parameter Each of the lifetime-related parameters such as the voltage V and the gas pressure Pini may be used alone (as the single parameter) for evaluation of the deterioration degree. Alternatively, a plurality of parameters may be combined to define a new (different) parameter, and the deterioration degree may be evaluated based on the value of the new parameter.

One parameter can be derived by combining r values (r dimensions), which is multiple. As a method of converting a plurality of parameters into one parameter, for example, various methods such as a method of using a conversion expression for obtaining a single value from r values by four arithmetic operations, a method of using a coefficient for an operation, and a dimension reduction can be applied.

For example, the two values of the voltage V and the gas pressure Pini are converted into a value between 1 to 100 representing a new feature amount. At this time, it is conceivable to divide the converted values 1 to 100 into 10 levels and give deterioration degrees 1 to 10 to the levels, respectively. Examples of the relationship between the label of 10 levels and the two values are shown in FIG. 15 and FIG. 16.

Figures 15, 16:
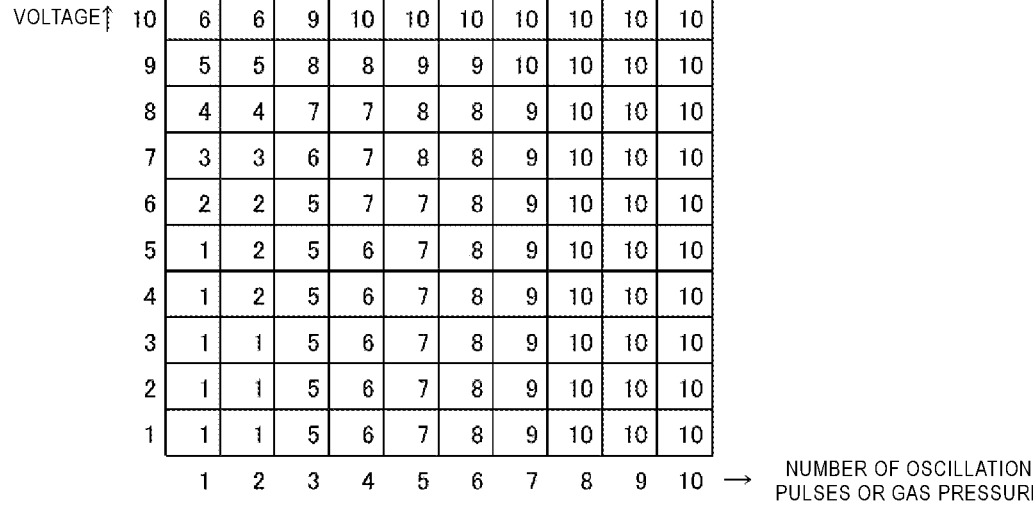
FIG. 15 is a diagram showing an example of giving a deterioration degree based on a feature value derived from two values of the voltage and a gas pressure.
FIG. 16 is a diagram showing another example of giving the deterioration degree based on the feature value derived from two values of the voltage and the gas pressure.

FIG. 15 shows an example in which the correlation between the label and the two values of the voltage V and the gas pressure Pini is linear. In FIG. 15, the horizontal axis represents the deterioration degree due to the number of oscillation pulses Np or the gas pressure Pini, and the vertical axis represents the deterioration degree due to the voltage V. The numerical value indicated in each cell of the matrix of 10 rows×10 columns shown in FIG. 15 represents the label of 10 levels given to the new feature amount derived from the combination of the values of the two parameters.

FIG. 16 shows a case in which the influence of the voltage V on the label is small and the influence of the gas pressure Pini on the label is large. As shown in FIG. 16, a new feature amount may be defined so as to give the label of the deterioration degree due to the combination of the voltage V and the gas pressure Pini by giving more importance to evaluation of the deterioration degree due to the gas pressure Pini than the deterioration degree due the voltage V.

5.2.8 Description of Case in which Data D(s) Includes a Plurality Pieces of Data As an acquisition condition of data used for learning, for example, the following case is assumed.

[Condition 1]

A set of data used for learning has been acquired once a day. Here, the "set of data" includes data of various parameters such as the number of oscillation pulses Np, the voltage V, and the gas pressure Pini for the laser device 10.

[Condition 2]

The laser device 10 has been used with the same number of oscillation pulses every day.

[Condition 3]

The laser chamber 100 has been replaced 500 days after the start of use.

[Condition 4]

For the laser chamber 100 that has been operated for 500 days until replacement, the operation period is equally divided into 10 sections with respect to the number of oscillation pulses Np, and a label of the deterioration degree due to the number of oscillation pulses Np is given to each section.

Counting the number of data items when condition 1 to 4 are satisfied is performed as follows. That is, the number of data items in the entire data D is 500.

Owing to condition 2 and condition 4, the number of data items included in each of the labels s (s=1 to 10) of the deterioration degrees 1 to 10 is 50. Each of D(1), D(2), . . . , D(10) includes 50 data items, and the total number of D(s), that is, the number of data items in the entire data D is 500.

Figure 17:
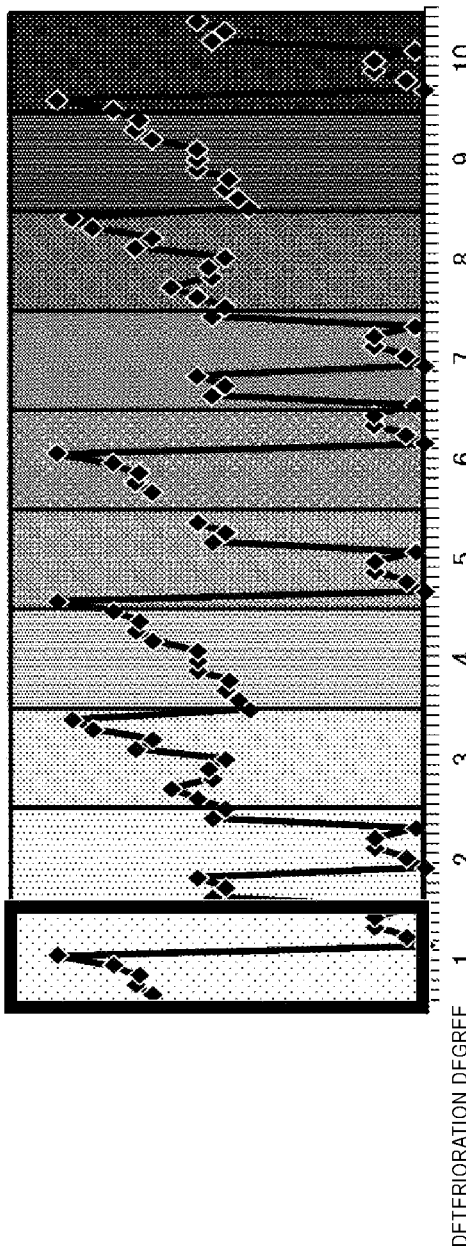
FIG. 17 is a graph showing an image in which a plurality of pieces of data are included in a section of one deterioration degree in which level division is performed by the number of oscillation pulses.

FIG. 17 is a graph showing an image in which a plurality of pieces of data are included in a section of one deterioration degree. In FIG. 17, the horizontal axis represents the number of oscillation pulses, and the vertical axis represents data of any parameter related to the lifetime. The horizontal axis is equally divided into 10 levels according to the number of oscillation pulses, and sections of deterioration degrees of 1 to 10 are defined. FIG. 17 shows an example in which 10 items of data are included in a section of one deterioration degree in order to simplify the illustration, but the number of data items included in one section is not limited to this example.

In the case of the assumed example satisfying the above-described conditions 1 to 4, as described above, 50 items of data are included in one section. Here, one section may include a larger number of data items, such as 100 data items or 1000 data items.

At the time of learning, an arbitrary number of data items may be randomly sampled from the entire data D to perform learning. For example, when the total number of data items is 500, learning is not sequentially performed for each deterioration degree, but a predetermined number (e.g., 50) of data items of various deterioration degrees are randomly extracted from the entire data D and learning is performed for 10 times.

Further, when rewriting the label of the deterioration degree, instead of rewriting a plurality of data items in the same section to a same label at once, it is preferable to rewrite the deterioration degree based on the voltage V and the gas pressure Pini for each data item in the same section, that is, for each of the entire data D.

Figure 18:
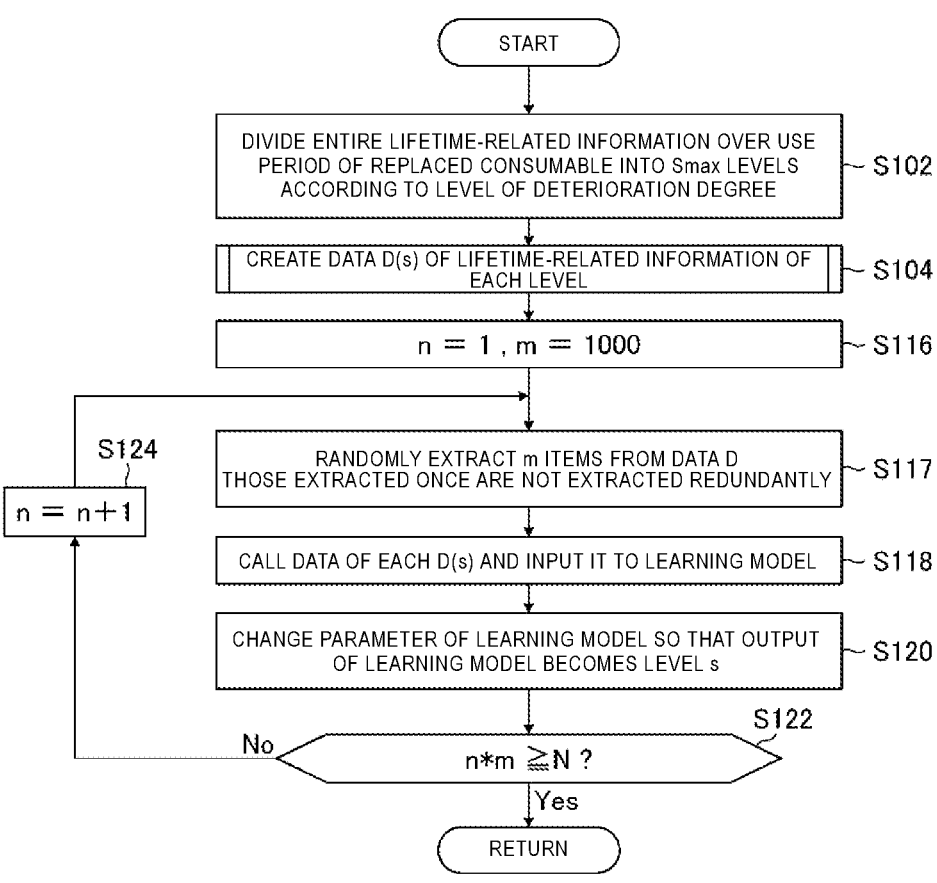
FIG. 18 is a flowchart showing example 2 of a processing content applied to step S48 of FIG. 7.

FIG. 18 is a flowchart showing example 2 of a processing content applied to step S48 of FIG. 7. FIG. 18 shows example 2 of the learning model creation subroutine. Instead of the flowchart shown in FIG. 11, the flowchart shown in FIG. 18 can be applied.

Step S102 and step S104 shown in FIG. 18 are similar to those in FIG. 11. Here, the data D(s) in step S104 of FIG. 18 includes all data with s being from 1 to Smax.

In step S116 after step S104, the learning model creation unit 340 sets a variable n to "1" as the initial value, and sets a variable m to "1000." Here, the variable n indicates the number of loops of processing to be described later. The variable m represents the number of data items extracted as a learning unit from the entire data D. When m=1000, it means that learning is performed collectively for every 1000 data items. That is, m may be understood as the batch size of a mini batch. Here, m may be an arbitrary number less than the total number of data items. Here, description will be provided on an example in which 1000 samples (data items) for learning are randomly extracted from the entire data D, and the learning is advanced in units of 1000 mini batches.

In step S117, the learning model creation unit 340 randomly extracts m items from the data D. At this time, those extracted once are not extracted redundantly. Data of various deterioration degrees may be mixed in the m items.

Here, the data D is a set of all data including D(1), D(2), . . . , D(Smax).

In step S118, the learning model creation unit 340 calls the data of each D(s) and inputs the data into the learning model.

In step S120, the learning model creation unit 340 changes the parameters of the learning model so as to increase the probability that the output of the learning model becomes the level s. The learning model is a neural network model to be described later, and a new learning model is created by changing the parameters of the model using supervised data.

In step S122, the learning model creation unit 340 determines whether or not the product of n and m is equal to or more than N. N is the total number of data items in the data D. When the determination result in step S122 is No, the learning model creation unit 340 proceeds to step S124, increments the value of the n, and returns to step S117. When the determination result in step S122 is Yes, the learning model creation unit 340 ends the flowchart of FIG. 18 and returns to the flowchart of FIG. 7. That is, when the determination result in step S112 becomes Yes, the learning model is updated to a new learning model in which the result of the consumable that has been replaced this time is reflected.

Although the flowchart of FIG. 18 is a flowchart in which learning is completed in one epoch, step S116 to step S122 may be repeated a plurality of times by setting the number of epochs to a value of two or more.

Figure 19:
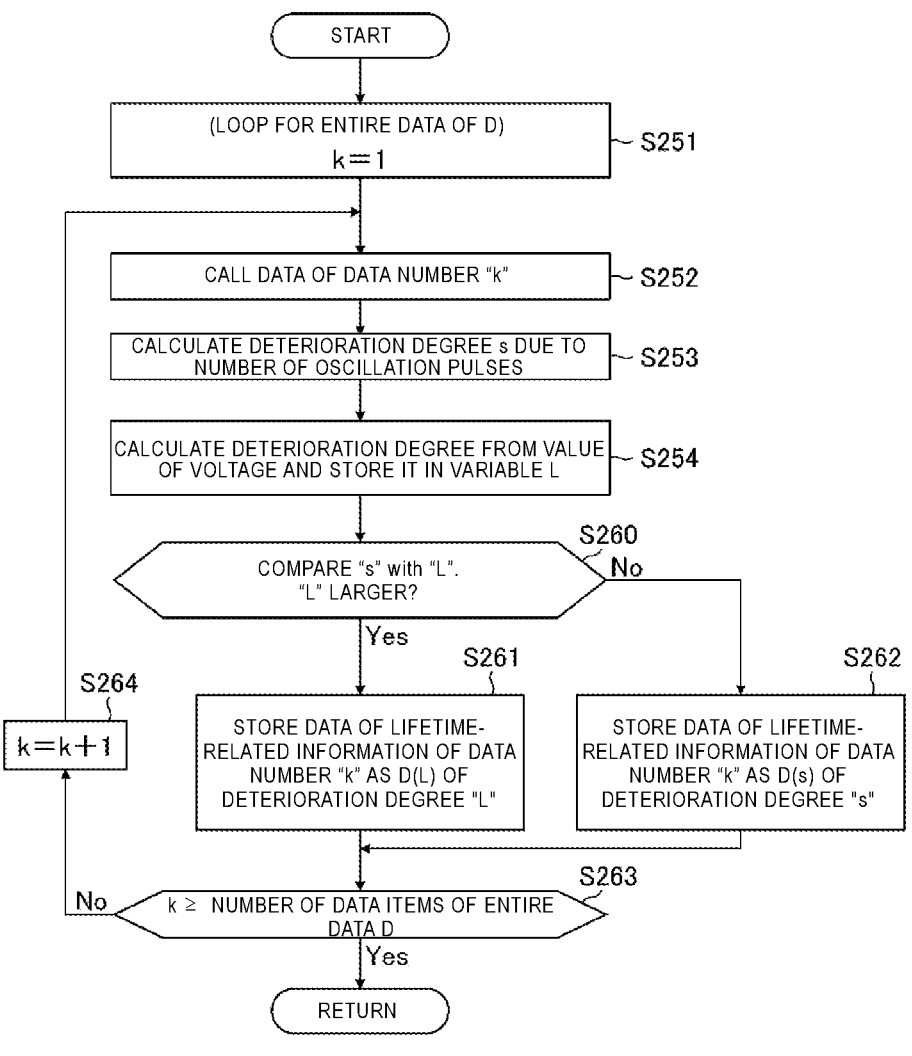
FIG. 19 is a flowchart showing an example of a processing content applied to step S104 of FIG. 18.

FIG. 19 is a flowchart showing an example of a processing content applied to step S104 of FIG. 18. As shown in FIGS. 8 and 9, the flowchart of FIG. 19 is an example of the "process of creating the data D(s) of the lifetime-related information at each level" when the deterioration degree DLn due to the number of oscillation pulses Np is rewritten in consideration of the deterioration degree DLv due to the voltage V.

In step S251 of FIG. 19, the learning model creation unit 340 sets the index k representing the data number to "1." The processing of step S252 and after is looped for the entire data of the datasets of the data D.

In step S252, the learning model creation unit 340 reads out the data of the data number "k."

In step S253, the learning model creation unit 340 calculates the deterioration degree s due to the number of oscillation pulses Np.

In step S254, the learning model creation unit 340 calculates the deterioration degree DLv from the value of the voltage V and stores the deterioration degree DLv in the variable L.

In step S260, the learning model creation unit 340 compares "s" with "L" to determine whether or not "L" is larger than "s." When the determination result in step S260 is Yes, the learning model creation unit 340 proceeds to step S261. In step S261, the learning model creation unit 340 stores data of the lifetime-related information of data number "k" as the data D(L) of the deterioration degree "L."

On the other hand, when the determination result in step S260 is No, the learning model creation unit 340 proceeds to step S262. In step S262, the learning model creation unit 340 stores the data of the lifetime-related information of data number "k" as data D(s) of the deterioration degree "s."

After step S261 or S262, the learning model creation unit 340 proceeds to step S263.

In step S263, the learning model creation unit 340 determines whether or not the value of k is equal to or more than the number N of data items of the entire data D. When the determination result in step S263 is No, the learning model creation unit 340 proceeds to step S264, increments the value of the index k, and returns to step S252. When the determination result in step S263 is Yes, the learning model creation unit 340 ends the flowchart of FIG. 19 and returns to the flowchart of FIG. 18.

Instead of FIG. 19, a flowchart corresponding to the flowchart described in FIG. 13 or FIG. 14 may be applied.

5.2.9 Example of Neural Network Model

Figure 20:
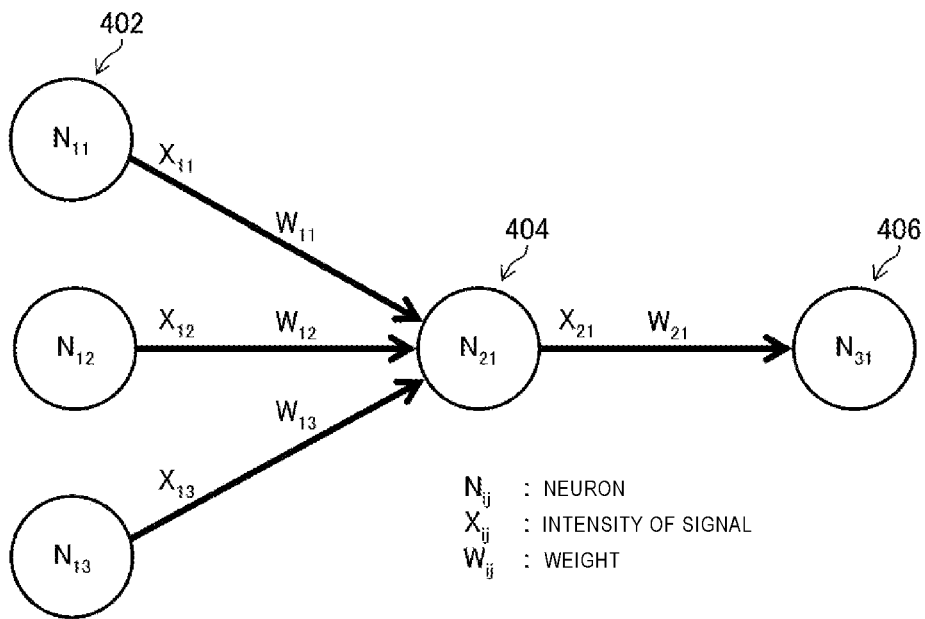
FIG. 20 is a schematic diagram showing an example of a neural network model.

FIG. 20 is a schematic diagram showing an example of a neural network model. In FIG. 20, a circle represents a neuron, and a straight line with an arrow represents a signal flow. Neurons $N_{11}$, $N_{12}$, $N_{13}$ of an input layer 402, a neuron $N_{21}$ of a hidden layer 404, and a neuron $N_{31}$ of an output layer 406 are shown from the left in FIG. 20. A layer number of a neural network having a layer structure is represented by i, a neuron number is represented by j, and the strength of a signal output from a neuron $N_{ij}$ is denoted by $X_{ij}$, and the signal is indicated by $X_{ij}$. The weight of connection between neurons in the i-th layer and the (i+1)-th layer is denoted by $W_{ij}$.

The neurons $N_{11}$, $N_{12}$, $N_{13}$ of the input layer 402 output signals having signal intensities of $X_{11}$, $X_{12}$, $X_{13}$, respectively. The neuron $N_{21}$ of the hidden layer 404 outputs a signal $X_{21}$ when the weighted signal sum $(W_{11} \times X_{11} + W_{12} \times X_{12} + W_{13} \times X_{13})$ of the input signals $X_{11}$, $X_{12}$, $X_{13}$ is larger than a threshold. When the threshold value is $b_{21}$, the neuron $N_{21}$ outputs the signal $X_{21}$ when $W_{11} \times X_{11} + W_{12} \times X_{12} + W_{13} \times X_{13} - b_{21} > 0$. Here, "$-b_{21}$" is called a bias of the neuron $N_{21}$.

The parameters of the neural network model include the weights and biases of connections between neurons.

5.2.10 Learning Mode of Neural Network Model

Figure 21:
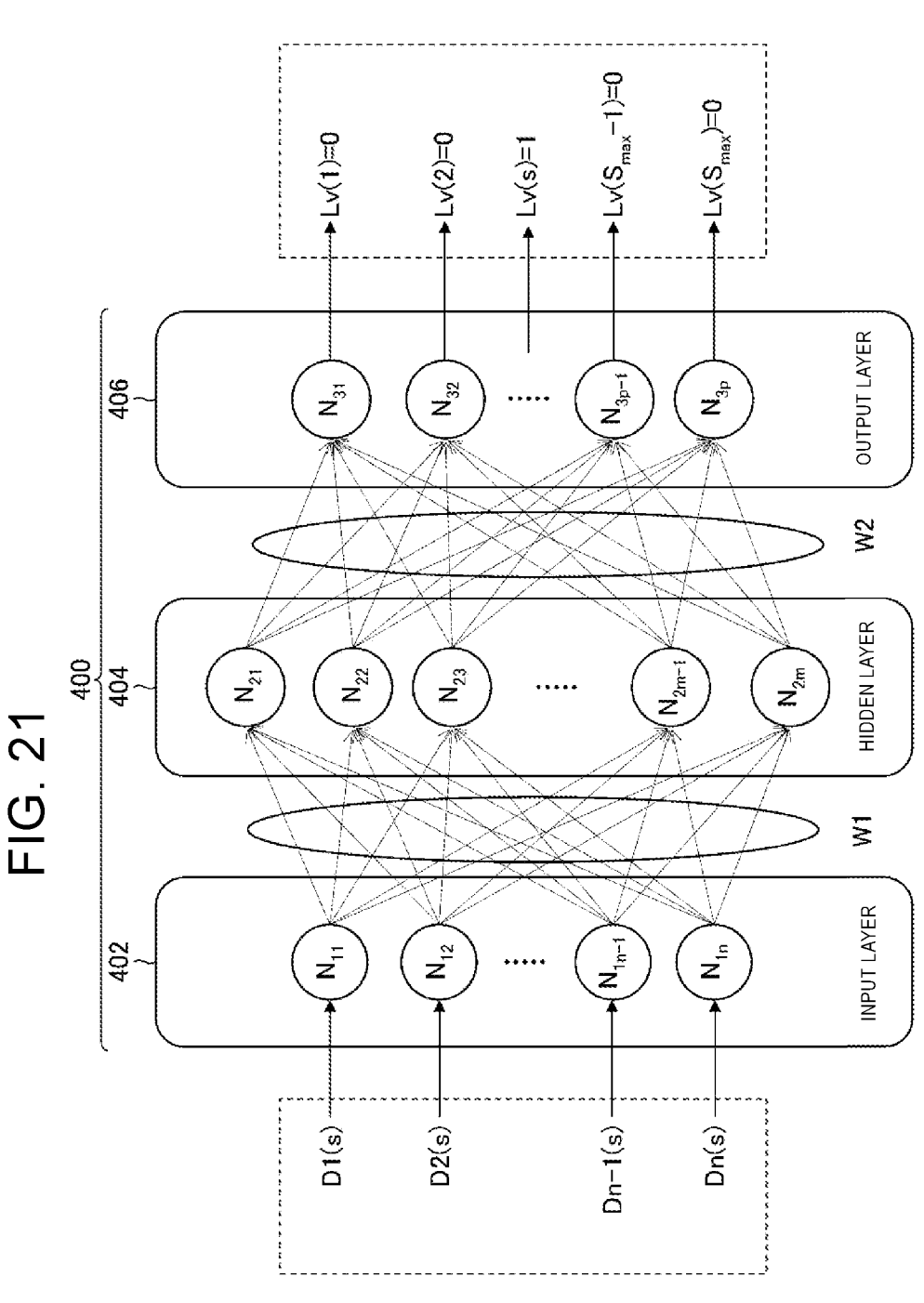
FIG. 21 is an example of a neural network model when a learning model is created.

FIG. 21 shows an example of a neural network model when a learning model is created. A neural network model 400 includes the input layer 402, the hidden layer 404, and the output layer 406.

The input layer 402 includes n neurons $N_{11}$ to $N_{1n}$, and log data at the time of the deterioration degree s among the lifetime-related information of the replaced consumable is input to each of the neurons $N_{11}$ to $N_{1n}$.

The hidden layer 404 includes m neurons $N_{21}$ to $N_{2m}$, and signals output from the neurons $N_{11}$ to $N_{1n}$ of the input layer 402 are input to the respective neurons $N_{21}$ to $N_{2m}$ of the hidden layer 404. A parameter W1 with different weight can be set for each of these input signals. Here, the respective weights of the signals input to the respective neurons $N_{21}$ to $N_{2m}$ of the hidden layer 404 is collectively referred to as the "parameter W1 of the weight."

The output layer 406 includes p neurons $N_{31}$ to $N_{3}p$, and signals output from the neurons $N_{21}$ to $N_{2m}$ of the hidden layer 404 are input to the respective neurons of the output layer 406. The number p of neurons of the output layer 406 may be equal to the number of levels (Smax) of the deterioration degree. A parameter W2 with a different weight can be set for each of these input signals. Here, the respective weights of the signals input to the respective neurons $N_{31}$ to $N_{3}p$ of the output layer 406 are collectively referred to as the "parameter W2 of the weight."

The probabilities of the deterioration degrees Lv(1) to Lv(Smax) through Lv(s) are output from the neurons N31 to N3P of the output layer 406. Here, the probability of the deterioration degree means a score indicating the probability corresponding to the level of each deterioration degree.

When the deterioration degree s is defined in Smax levels from 1 to Smax, each of the lifetime-related information (log data) D1(s), D2(s), . . . , Dn(s) of the replaced consumable is input to the input layer 40.

The weights and biases between neurons are adjusted such that the output from the output layer 406 results in that the probability of Lv(s) approaches 1 and the probabilities of other deterioration degrees approach 0 for the respective inputs of the respective deterioration degree s.

As described above, the learning model for predicting the lifetime of a consumable is created by supervised machine learning. The machine learning method according to the first embodiment is understood as a method of creating a prediction model (learned model) in which learning is completed to output a prediction value of the deterioration degree of a consumable with respect to an input of the lifetime-related information of the consumable.

5.2.11 Processing Example of Consumable Lifetime Prediction Unit

Figure 22:
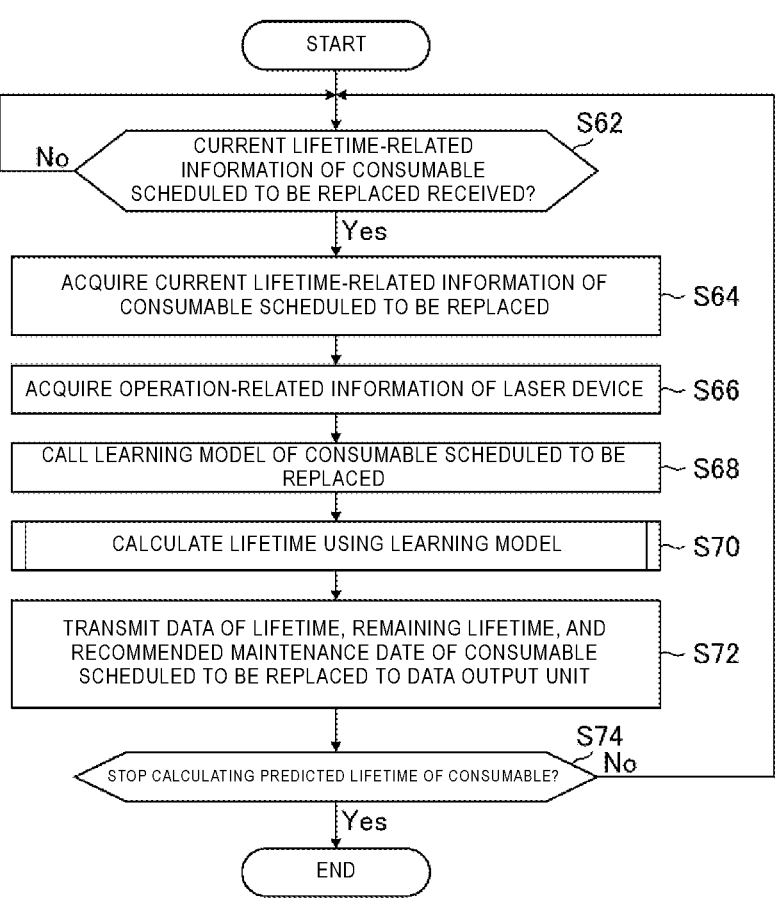
FIG. 22 is a flowchart showing an example of a processing content by a consumable lifetime prediction unit.

FIG. 22 is a flowchart showing an example of a processing content by the consumable lifetime prediction unit 360. The processing and operation shown in the flowchart of FIG. 22 is realized, for example, by a processor functioning as the consumable lifetime prediction unit 360 executing a program.

In step S62 of FIG. 22, the consumable lifetime prediction unit 360 determines whether or not the current lifetime-related information of the consumable scheduled to be replaced has been received. When the determination result in step S62 is No, the consumable lifetime prediction unit 360 repeats step S62. When the determination result in step S62 is Yes, the consumable lifetime prediction unit 360 proceeds to step S64.

In step S64, the consumable lifetime prediction unit 360 acquires the current lifetime-related information of the consumable scheduled to be replaced. The current lifetime-related information acquired in step S64 is an example of the "second lifetime-related information" in the present disclosure.

In step S66, the consumable lifetime prediction unit 360 acquires operation-related information of the laser device 10. Next, in step S68, the consumable lifetime prediction unit 360 calls the learning model of the consumable scheduled to be replaced. Here, the learning model stored in the file (the file Am, the file Bm, or the file Cm) corresponding to the consumable scheduled to be replaced (the laser chamber 100, the monitor module 108, or the line narrowing module 106) is called.

Then, in step S70, the consumable lifetime prediction unit 360 calculates the lifetime using the learning model. That is, the consumable lifetime prediction unit 360 calculates the lifetime, the remaining lifetime, and the recommended maintenance date using the learning model based on the current lifetime-related information of the consumable scheduled to be replaced.

In step S72, the consumable lifetime prediction unit 360 transmits, to the data output unit 370, data of the lifetime, the remaining lifetime, and the recommended maintenance date of the consumable scheduled to be replaced.

In step S74, the consumable lifetime prediction unit 360 determines whether or not to stop calculating the predicted lifetime of the consumable. When the determination result in step S74 is No, the consumable lifetime prediction unit 360 returns to step S62 and repeats step S62 to step S74. When the determination result in step S74 is Yes, the consumable lifetime prediction unit 360 ends the flowchart of FIG. 22.

Figure 23:
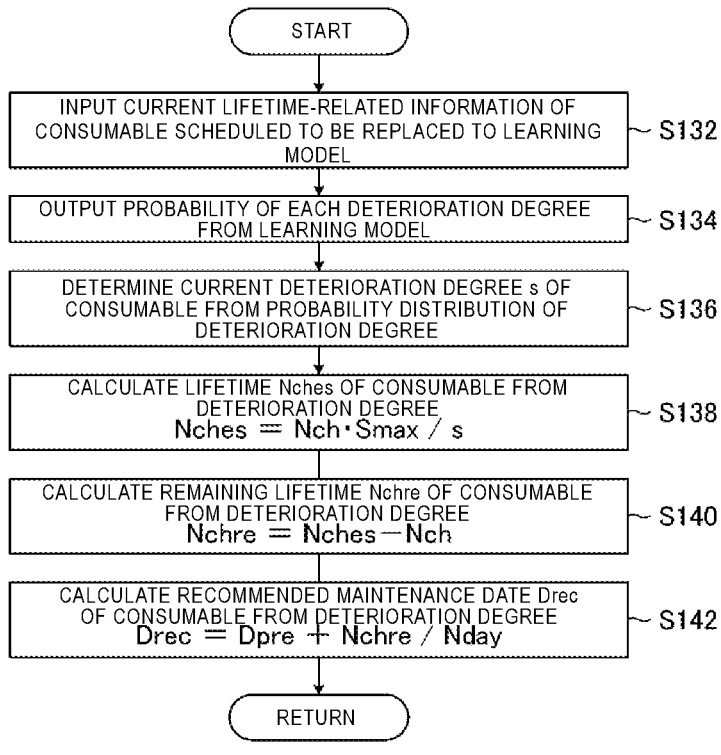
FIG. 23 is a flowchart showing an example of a processing content applied to step S70 of FIG. 22.

FIG. 23 is a flowchart showing an example of a subroutine of a process of performing lifetime calculation using a learning model. That is, FIG. 23 is a flowchart showing an example of a processing content applied to step S70 of FIG. 22.

In step S132 of FIG. 23, the consumable lifetime prediction unit 360 inputs, to the learning model, the current lifetime-related information of the consumable scheduled to be replaced.

In step S134, the consumable lifetime prediction unit 360 outputs the probabilities of the deterioration degrees Lv(1) to Lv(Smax) from the learning model.

In step S136, the lifetime prediction unit 360 determines the current deterioration degree s of the consumable from the probability distribution of the deterioration degree. As a first example of the determination method of the deterioration degree s, for example, the deterioration degree having the highest probability may be extracted. As a second example of the determination method of the deterioration degree s, an approximate curve may be obtained from the probability distribution of the deterioration degree, and the deterioration degree s with the highest probability distribution may be obtained. In the case of the second example, the deterioration degree s is not an integer, but is obtained up to a numerical value after the decimal point. In the case of the second example, the lifetime and the remaining lifetime of the consumable can be predicted with higher accuracy than in the case of the first example.

In step S138, the consumable lifetime prediction unit 360 further calculates a lifetime Nches of the consumable from the deterioration degree obtained in step S136. The lifetime Nches of the consumable is calculated from Nches=Nch*Smax/s using a current number of oscillation pulses Nch. In the equation, "*" represents multiplication.

In step S140, the consumable lifetime prediction unit 360 further calculates a remaining lifetime Nchre of the consumable from the deterioration degree obtained in step S136. The remaining lifetime time Nchre of the consumable is calculated from Nchre=Nches-Nch using the current number oscillation pulses Nch.

In step S142, the consumable lifetime prediction unit 360 calculates the recommended maintenance date Drec of the consumable. The recommended maintenance date Drec is calculated from Drec=Dpre+Nchre/Nday.

After step S142, the consumable lifetime prediction unit 360 ends the flowchart of FIG. 23, and returns to the flowchart of FIG. 22.

Figure 24:
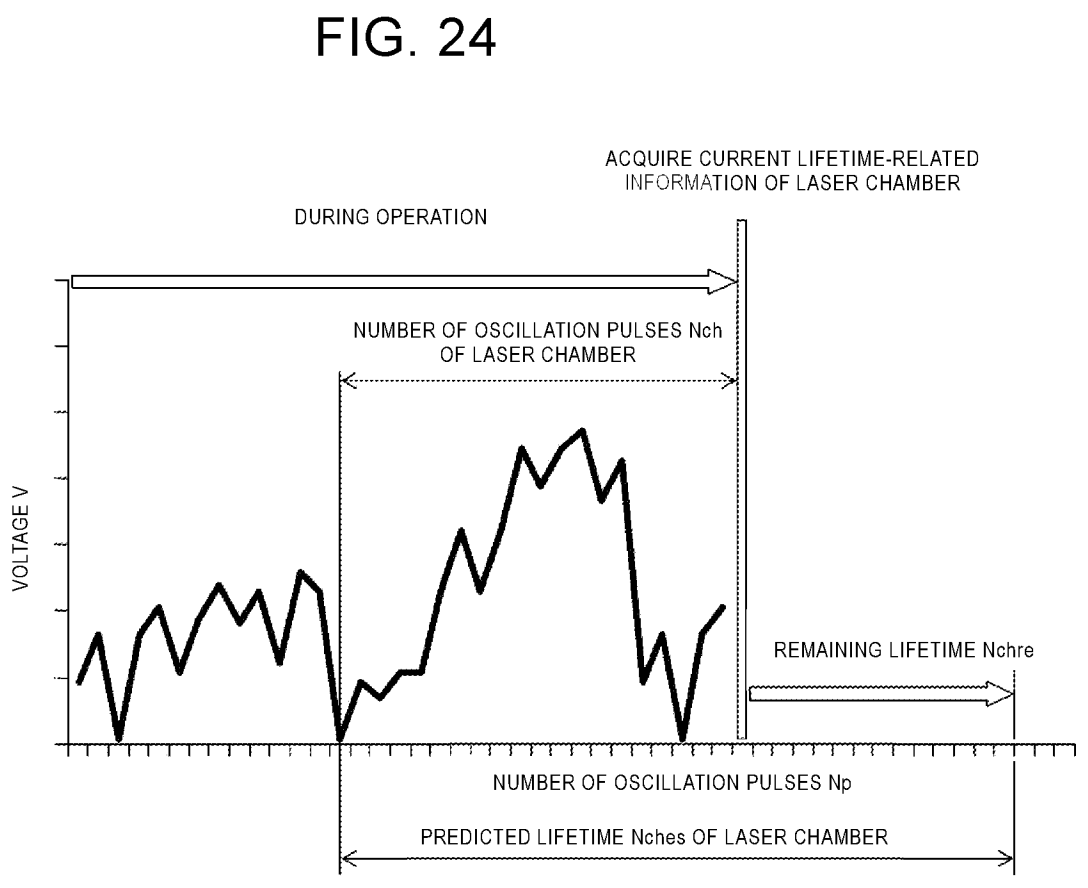

5.2.12 Example of Process for Calculating Lifetime of Consumable Using Learning Model FIG. 24 shows an example of calculating the lifetime and the remaining lifetime of the laser chamber 100 using the created learning model. When calculating the predicted lifetime of the currently operating laser chamber 100, the consumable lifetime prediction unit 360 obtains the current lifetime-related information of the laser chamber 100. Here, the current number of oscillation pulses Nch of the laser chamber 100 is acquired.

Next, when the current lifetime-related information of the laser chamber 100 is input to the created learning model, the probabilities of the deterioration degrees Lv(1) to Lv(10) of the plurality of levels are calculated. FIG. 25 shows an example of the probability for each deterioration degree in 10 levels. In the example of FIG. 25, it is determined that the probability of the deterioration degree 7 is the highest.

In this case, the predicted lifetime Nches of the currently operating laser chamber 100 is obtained by the following Equation 1.

$$Nches = Nch*10/7 \qquad \text{(Equation 1)}$$

The remaining lifetime Nchre is obtained by the following Equation 2.

$$Nchre = Nches - Nch = Nch*3/7 \qquad \text{(Equation 2)}$$

5.2.13 Lifetime Prediction Mode of Neural Network Model

Figure 26:
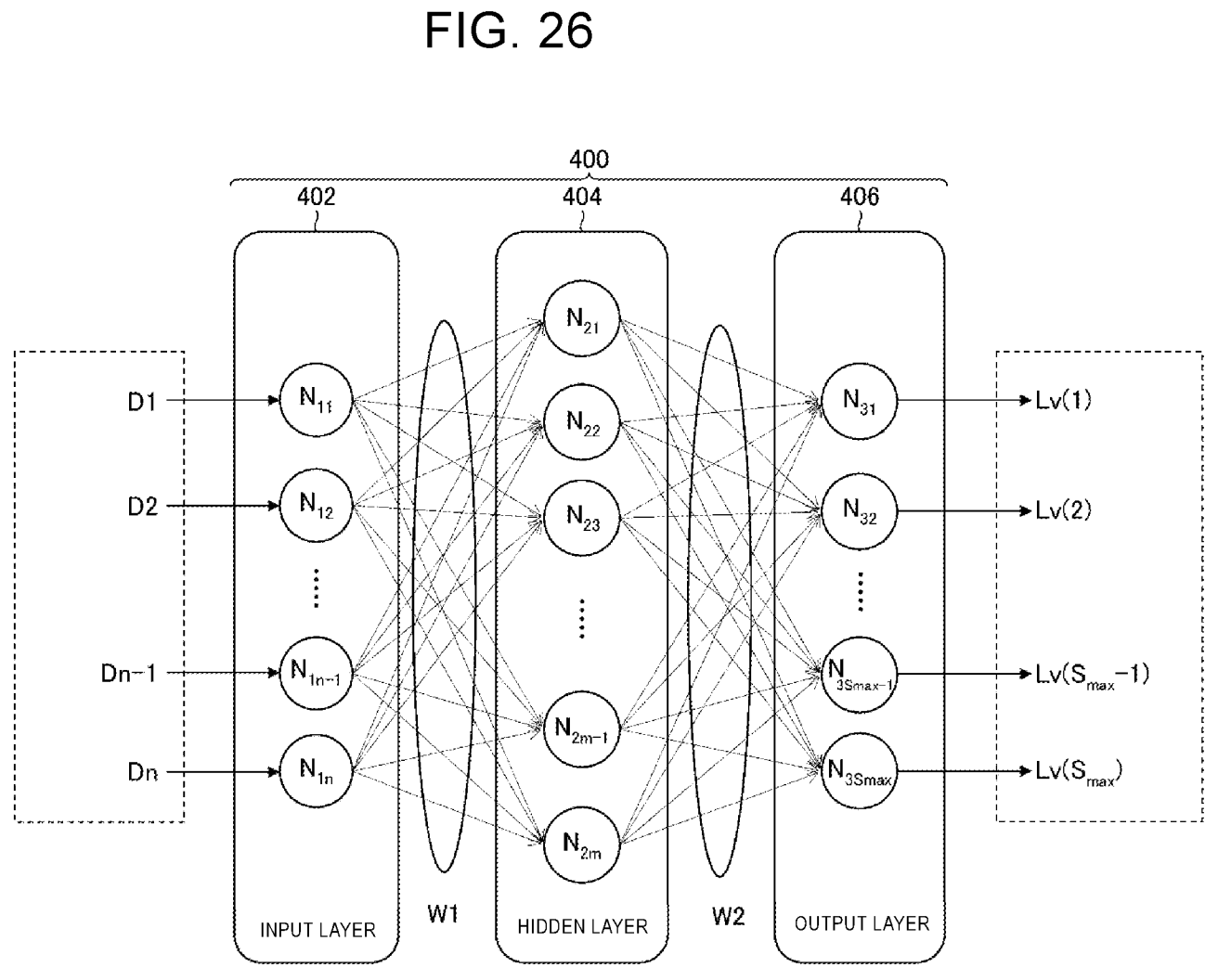

FIG. 26 shows an example of a process of predicting the lifetime of the consumable by the neural network model 400 in which learning is completed. The network structure of the neural network model 400 is similar to that of FIG. 21. In FIG. 26, the parameters W1, W2 of the weights between neurons are set to be optimized according to the learning model described with reference to FIG. 21.

When lifetime prediction is currently performed on the consumable, the current lifetime-related information (log data) D1, D2, . . . , Dn of the consumable is input to the input layer 402. Consequently, the respective probabilities of the deterioration degrees Lv(1) to Lv(Smax) from the output layer 406 are output (see FIG. 25).

5.2.14 Others

FIGS. 21 and 26 show an example in which the number of hidden layers 404 of the neural network model 400 is one. However, not limited thereto, the number of hidden layers 404 may be plural.

In the present embodiment, an example of machine learning by supervised learning is shown, but not limited thereto, machine learning by unsupervised learning may be performed. For example, the input data can be reduced in dimension to cluster similar features in the data sets. Using this result, it is possible to predict the output by setting a certain criterion and allocating the output so as to optimize the criterion.

5.2.15 Processing Example of Data Output Unit

Figure 27:
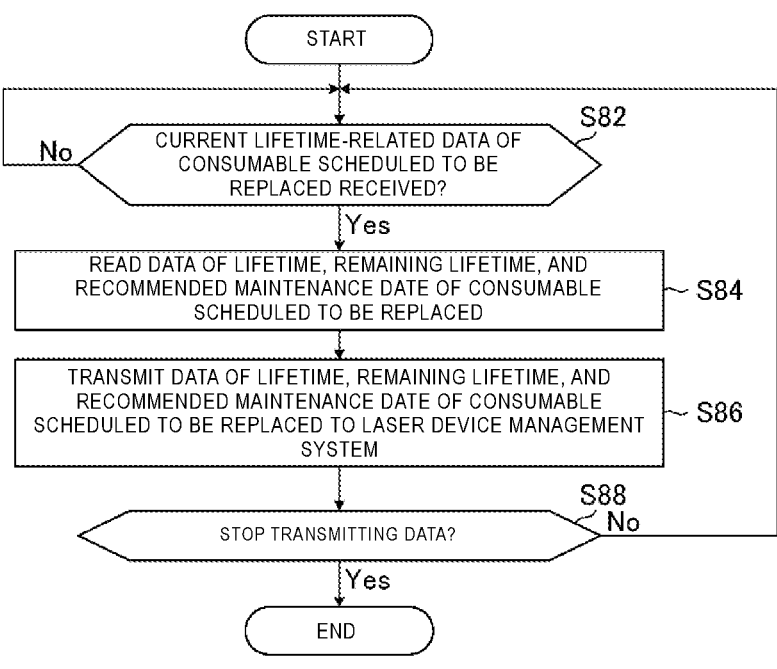
FIG. 27 is a flowchart showing an example of a processing content by a data output unit.

FIG. 27 is a flowchart showing an example of a processing content by the data output unit 370. The processing and operation shown in the flowchart of FIG. 27 is realized, for example, by a processor functioning as the data output unit 370 executing a program.

In step S82, the data output unit 370 determines whether or not lifetime data of the consumable scheduled to be replaced has been received. When the determination result in step S82 is No, the data output unit 370 repeats step S82. When the determination result in step S82 is Yes, the data output unit 370 proceeds to step S84.

In step S84, the data output unit 370 reads data of the lifetime, the remaining lifetime, and the recommended maintenance date of the consumable scheduled to be replaced.

In step S86, the data output unit 370 transmits the data of the lifetime, the remaining lifetime, and the recommended maintenance date of the consumable scheduled to be replaced. The transmission destination of the data may be the laser device management system 206 and/or the semiconductor factory management system 208. Alternatively, the transmission destination of the data may be a terminal device (not shown) or the like connected to the network 210.

In step S88, the data output unit 370 determines whether or not to stop the transmission of the data. When the determination result in step S88 is No, the data output unit 370 returns to step S82 and repeats step S82 to step S88. When the determination result in step S88 is Yes, the data output unit 370 ends the flowchart of FIG. 27.

5.3 Lifetime-Related Information of Laser Chamber

FIGS. 28 to 30 show an example of the lifetime-related information of the laser chamber 100. The lifetime-related information of the laser chamber 100 includes, for example, an electrode deterioration parameter, a pulse energy stability parameter, a gas control parameter, an operation load parameter, and a deterioration parameter of an optical element of the laser resonator. Here, the notation "OC" in the table shown in FIG. 30 represents the output coupling mirror.

Among these lifetime-related parameters, at least the lifetime-related parameters necessary for accurate lifetime prediction of the laser chamber 100 are the electrode deterioration parameter, the pulse energy stability parameter, and the gas control parameter. Preferably, furthermore, the accuracy of the lifetime prediction may be improved by using the operation load parameter. This is because the lifetime of the laser chamber 100 may be shortened when the operation load is high.

Further, preferably, the accuracy of the lifetime prediction may be further improved by using the deterioration parameter of the line narrowing module 106 and the deterioration parameter of the window of the laser chamber 100, which are indicative of the loss of the laser resonator.

The electrode deterioration parameter includes at least the number of times of discharge. The number of times of discharge is approximately equal to the number of oscillation pulses Np after replacement of the laser chamber 100. The integrated value of input energy may be further added as the electrode deterioration parameter.

In the case of the single chamber type laser device 10 as shown in FIG. 1, since there is a correlation between the spectral line width and the discharge width, the spectral line width may be used as one of the electrode deterioration parameters.

The pulse energy stability parameter includes at least a variation of the pulse energy. Further, a variation of the integrated value (exposure amount) of the pulse energy may be added as the pulse energy stability parameter.

When the gas pressure of the laser chamber 100 is controlled so that the charge voltage falls within a predetermined range, the gas control parameter includes at least the gas pressure in the laser chamber 100 and the gas pressure in the laser chamber 100 after the total gas replacement and adjustment oscillation.

When constant control is performed on the gas in the laser chamber 100 and the charge voltage is controlled, the gas control parameter includes at least the charge voltage and the charge voltage after the total gas replacement and adjustment oscillation. Preferably, an integrated value of the injection amount of the gas containing halogen after the laser chamber 100 is replaced or an integrated value of the injection of the laser gas after the laser chamber 100 is replaced may be added. Accordingly, the accuracy of the lifetime prediction may be further improved.

Further, preferably, the injection amount of the gas containing halogen or the injection amount of the laser gas per unit oscillation pulse may be added.

The operation load parameter may be substituted by the average power of the laser light output from the laser device 10 or the duty of the burst operation when the target pulse energy is kept nearly unchanged.

In particular, it is preferable that the operating load parameter during the exposure operation is used. In a factory for manufacturing semiconductors, the operation load is high when a memory element is manufactured, and the operation load may be low when a logic-related element is manufactured.

The deterioration parameter of the optical element of the laser resonator includes the deterioration parameter of the window, the deterioration parameter of the line narrowing module 106, and the deterioration parameter of the output coupling mirror 104, and includes at least the number of oscillation pulses Np after the replacement of each optical element. When the pulse energy of the pulse laser light output from the laser device 10 is greatly changed, an integrated value of the pulse energy or an integrated value of the square of the pulse energy, which is a parameter of the deterioration of the optical element due to two beam absorption, may be used.

5.4 Example of Lifetime-Related Information of Monitor Module

FIG. 31 shows an example of the lifetime-related information of the monitor module 108. The lifetime of the monitor module 108 is often determined by deterioration of the optical element and deterioration of the optical sensor. The lifetime-related information of the monitor module 108 includes at least one of a deterioration parameter of an optical element arranged in the monitor module 108 and a deterioration parameter of the optical sensor.

The deterioration parameter of the optical element of the monitor module 108 includes at least the number of oscillation pulses Np after replacement of the monitor module 108. When the pulse energy of the pulse laser light output from the laser device 10 is greatly changed, an integrated value of the pulse energy or an integrated value of the square of the pulse energy, which is a parameter of the deterioration of the optical element due to two beam absorption, may be used.

The deterioration parameter of the optical sensor includes the detected light intensity of the image sensor as the optical sensor, the spectral line width, the pulse energy, and the integrated value of the pulse energy.

At least the deterioration parameter necessary for performing the lifetime prediction of the monitor module 108 is the detected light intensity of the image sensor. Since the intensity of light entering the image sensor varies depending on the spectral line width and the pulse energy, values of the spectral line width and the pulse energy may be used supplementarily. Since the integrated value of the pulse energy is a value close to the amount of light exposed to the image sensor, this value may be used.

[Others]

In the example shown in FIG. 31, the optical sensor included in the pulse energy detector 144 of the monitor module 108 is, for example, a photodiode or a pyroelectric element. Deterioration of these sensors can also be evaluated by the integrated value of the pulse energy after the monitor module 108 is replaced. When the target pulse energy does not change significantly, the number of oscillation pulses Np after the replacement of the monitor module can be used instead.

5.5 Example of Lifetime-Related Information of Line Narrowing Module

FIG. 32 shows an example of the lifetime-related information of the line narrowing module 106. The lifetime of the line narrowing module 106 is often determined by deterioration of an optical element and deterioration of the wavelength actuator. The lifetime-related information of the line narrowing module 106 includes at least one of deterioration parameters of optical elements (a plurality of prisms and a grating) arranged in the line narrowing module 106, a deterioration parameter of the wavelength actuator, and a deterioration parameter of a wavefront.

At least the deterioration parameter necessary for the lifetime prediction of the line narrowing module 106 is the deterioration parameter of the optical element of the line narrowing module 106. Preferably, the deterioration parameter of the wavelength actuator and the deterioration parameter of the wavefront may be added.

The deterioration parameter of the optical element of the line narrowing module 106 includes at least the number of oscillation pulses after replacement of the line narrowing module 106. When the pulse energy of the pulse laser light output from the laser device 10 is greatly changed, an integrated value of the pulse energy or an integrated value of the square of the pulse energy, which is a parameter of the deterioration of the optical element due to two beam absorption, may be used.

The deterioration parameter of the wavelength actuator includes wavelength stability.

Since the wavelength control becomes unstable when the wavelength actuator deteriorates and the operation becomes worse, there is a possibility that the lifetime can be evaluated by using the wavelength stability.

The parameter of the deterioration of the wavefront includes the spectral line width. Since the spectral line width of the pulse laser light output from the laser device 10 increases due to the distortion of the wavefront of the line narrowing module 106, there is a possibility that the lifetime can be evaluated by using the spectral line width. For example, when synthetic quartz is used for the prism, the transmitted wavefront of the prism may be distorted and the spectral line width may increase due to compaction.

5.6 Effect

The values of parameters such as the voltage V and the gas pressure Pini have a clear correlation with the deterioration of the laser chamber 100. If the deterioration degree of the laser chamber 100 is evaluated only by the number of oscillation pulses Np and the label of the deterioration degree that increases stepwise with respect to the number of oscillation pulses Np is given, it is not possible to learn the relationship between the voltage V and the gas pressure Pini described above. Therefore, when the label of the deterioration degree is given only by the number of oscillation pulses Np, it is difficult to create a learning model for predicting an appropriate deterioration degree with respect to, for example, deterioration from the initial stage, rapid deterioration, or temporary deterioration.

In this regard, according to the first embodiment, by rewriting the deterioration degree DLn due to the number of oscillation pulses Np into a label having a more appropriate deterioration degree using the lifetime-related parameters such as the voltage V and/or the gas pressure Pini, it is possible to create a learning model in which the value of the parameters and the label of the deterioration degree are correctly correlated with each other. With the training data creation method according to the first embodiment, it is possible to obtain a data set of training data that enables creation of a learning model with high prediction accuracy.

According to the consumable management server 310 according to the first embodiment, it is possible to accurately predict the lifetime of each of the consumables scheduled to be replaced by using the corresponding learning model for each of the consumables scheduled to be replaced in the laser device 10 based on the lifetime-related information of each of the consumables.

5.7 Others

In the first embodiment, as a method of rewriting the deterioration degree DLn due to the number of oscillation pulses Np to a label having a more appropriate deterioration degree by using a lifetime-related parameter such as the voltage V and/or the gas pressure Pini, an example in which the deterioration degree having the highest deterioration level is given has been described, but a method of determining one deterioration degree from a plurality of deterioration degrees according to a different evaluation index is not limited to this example. For example, an average value of a plurality of deterioration degrees may be calculated, and the average value may be used as the label of the deterioration degree to be actually given. As a specific example, when the deterioration degree DLn due to the number of oscillation pulses Np is 2 and the deterioration degree DLv due to the voltage V is 6, "4" which is the average value of these values may be used as the label of the deterioration degree to be actually given.

Further, a plurality of parameters related to the lifetime of the consumable may be weighted, a weighted average of the deterioration degrees due to the respective parameters may be calculated, and the value may be used as the label of the deterioration degree to be actually given.

In the first embodiment, an example of a case of a KrF excimer laser for an exposure apparatus in a semiconductor factory is shown, but the present invention is not limited to this, and may be applied to, for example, an excimer laser for annealing of a flat panel or an excimer laser for processing. In these cases, a rear mirror may be arranged in place of the line narrowing module 106, and the spectral detector 146 of the monitor module 108 may be omitted.

6. Modification

The function of creating training data, the function of creating a learning model by machine learning using the created training data, and the function of performing processing of lifetime prediction of the consumable using the created learning model in the consumable management server 310 described in the first embodiment may be realized by separate devices (such as servers).

Further, the training data creation process and the learning process using the training data may be performed in a series of the processing flow, or the respective processes may be performed independently.

7. Computer Readable Medium in which Program is Recorded

A program including instructions for causing a computer to function as the consumable management server 310 described in each of the above-described examples may be recorded on an optical disk, a magnetic disk, or another computer readable medium (tangible non-transitory information storage medium), and the program may be provided through the information storage medium. The program is incorporated in the computer, and a processor executes the instructions of the program, whereby the function of the consumable management server 310 can be realized by the computer.

The description above is intended to be illustrative and the present disclosure is not limited thereto. Therefore, it would be obvious to those skilled in the art that various modifications to the embodiments of the present disclosure would be possible without departing from the spirit and the scope of the appended claims.

The terms used throughout the present specification and the appended claims should be interpreted as non-limiting terms. For example, terms such as "comprise", "include", "have", and "contain" should not be interpreted to be exclusive of other structural elements. Further, indefinite articles "a/an" described in the present specification and the appended claims should be interpreted to mean "at least one" or "one or more." Further, "at least one of A, B, and C" should be interpreted to mean any of A, B, C, A+B, A+C, B+C, and A+B+C as well as to include combinations of the any thereof and any other than A, B, and C.

What is claimed is:

1. A training data creation method used for machine learning of a learning model for predicting lifetime of a replaceable component of a laser device, the method comprising:

acquiring lifetime-related information including data indicating a degree of deterioration of the replaceable component recorded in association with each of numbers of pulses of laser oscillation of the laser device during a period from start of use to replacement of the replaceable component;

determining a first deterioration degree of the replaceable component over the period based on a number of pulses of laser oscillation of the laser device;

determining a second deterioration degree of the replaceable component over the period based on the data;

determining a comprehensive deterioration degree of the replaceable component based on the first deterioration degree and the second deterioration degree; and creating training data for supervised training of the learning model to predict the lifetime of the replaceable component, the training data including the lifetime-related information in association with the comprehensive deterioration degree.

2. The training data creation method according to claim 1, wherein determining the comprehensive deterioration degree comprises determining a deterioration degree among the first deterioration degree and the second deterioration degree having a higher level of deterioration.

3. The training data creation method according to claim 1, wherein the data includes a voltage applied between discharge electrodes arranged in a laser chamber.

4. The training data creation method according to claim 1, wherein the data includes an initial gas pressure after replacing laser gas in a laser chamber.

5. The training data creation method according to claim 1, wherein the lifetime-related information includes data of a plurality of data indicating degrees of deterioration of the replaceable component, determining the second deterioration degree comprises determining a plurality of second deterioration degrees indicated by the plurality of data, and determining the comprehensive deterioration degree comprises determining a deterioration degree among the plurality of second deterioration degrees and the first deterioration degree having a highest level of deterioration.

6. The training data creation method according to claim 5, wherein the data includes a voltage applied between discharge electrodes arranged in a laser chamber of the laser device and an initial gas pressure after replacing laser gas in the laser chamber.

7. The training data creation method according to claim 1, wherein the lifetime-related information includes data of a plurality of data indicating degrees of deterioration of the replaceable component, and determining the second deterioration degree comprises determining the second deterioration degree based on the degrees of deterioration.

8. The training data creation method according to claim 1, wherein the first deterioration degree includes a plurality of levels of deterioration in accordance with the number of pulses of laser oscillation of the laser device, and the plurality of levels of deterioration of the replaceable component increase as the number of pulses of laser oscillation of the laser device increases over the period.

9. The training data creation method according to claim 8, wherein the plurality of levels include ten levels.

10. The training data creation method according to claim 8, wherein a maximum value of the second deterioration degree is equal to a maximum value of the first deterioration degree.

11. The training data creation method according to claim 8, wherein determining the second deterioration degree comprises determining the second deterioration degree such that the second deterioration degree, when a value of the data is less than a predetermined threshold, is equal to or less than a minimum value of the plurality of levels of deterioration of the first deterioration degree.

12. The training data creation method according to claim 1, wherein the replaceable component comprises at least one of a laser chamber of the laser device, a monitor module of the laser device, and a line narrowing module of the laser device, and the data comprises at least one of a voltage of the laser device, a gas pressure of the laser device, an electrode deterioration of the laser chamber, a pulse energy stability of the laser chamber, a gas control of the laser chamber, an operation load of the laser chamber, a deterioration of an optical element of a laser resonator, a deterioration of a window of the laser chamber, a deterioration of an optical element of the monitor module, a deterioration of an optical sensor of the monitor module, a light intensity of an image sensor of the monitor module, a deterioration of optical elements of the line narrowing module, a deterioration of a wavelength actuator of the line narrowing module, and a deterioration of a wavefront of the line narrowing module.

13. A machine learning method for creating a learning model for predicting lifetime of a replaceable component of a laser device, the method comprising:

acquiring lifetime-related information including data indicating a degree of deterioration of the replaceable component recorded in association with each of numbers of pulses of laser oscillation of the laser device during a period from start of use to replacement of the replaceable component;

determining a first deterioration degree of the replaceable component over the period based on a number of pulses of laser oscillation of the laser device;

determining a second deterioration degree of the replaceable component over the period based on the data;

determining a comprehensive deterioration degree of the replaceable component based on the first deterioration degree and the second deterioration degree;

creating training data for supervised training of the learning model to predict the lifetime of the replaceable component, the training data including the lifetime-related information in association with the comprehensive deterioration degree;

creating the learning model for predicting the lifetime of the replaceable component based on the data included in the lifetime-related information by performing machine learning using the training data; and storing the created learning model.

14. The machine learning method according to claim 13, wherein the learning model is a neural network model.

15. A replaceable component management device comprising:

a storage device configured to store the learning model created by performing the machine learning method according to claim 13; and a processor, wherein the processor receives a requirement signal for lifetime prediction processing of a replaceable component scheduled to be replaced in the laser device; acquires current lifetime-related information related to the replaceable component scheduled to be replaced; calculates lifetime and remaining lifetime of the replaceable component scheduled to be replaced based on the learning model and the current lifetime-related information of the replaceable component scheduled to be replaced; and notifies an external apparatus of information of at least one of the lifetime and the remaining lifetime of the replaceable component scheduled to be replaced obtained by the calculation.

16. The replaceable component management device according to claim 15, wherein the processor inputs the current lifetime-related information to the learning model; acquires, from the learning model, a score indicating a probability of a level of a deterioration degree of the replaceable component corresponding to the current lifetime-related information; and calculates lifetime and remaining lifetime of the replaceable component scheduled to be replaced based on a current number of pulses of laser oscillation of the laser device included in the current lifetime-related information and the score.

17. A computer readable medium which is non-transitory and in which a program is recorded, the program causing a computer, when executed by the computer, to actualize a function of creating training data to be used for machine learning of a learning model for predicting lifetime of a replaceable component of a laser device, and including an instruction to cause the computer to actualize a function of acquiring lifetime-related information which includes data of at least one of the laser device and the replaceable component recorded corresponding to each of numbers of pulses of laser oscillation of the laser device during a period from start of use to replacement of the replaceable component, a function of determining a first deterioration degree of the replaceable component over the period based on a number of pulses of laser oscillation of the laser device, a function of determining a second deterioration degree of the replaceable component over the period based on the data, a function of determining a comprehensive deterioration degree of the replaceable component based on the first deterioration degree and the second deterioration degree, and a function of creating training data for supervised training of the learning model to predict the lifetime of the replaceable component, the training data including the lifetime-related information in association with the comprehensive deterioration degree.

18. The computer readable medium according to claim 17, wherein the program further includes an instruction to cause the computer to actualize a function of creating the learning model for predicting the lifetime of the replaceable component from the data included in the lifetime-related information by performing the machine learning using the training data and a function of storing the created learning model.

19. A computer readable medium which is non-transitory and in which a program for causing a computer to actualize functions is recorded, the functions including:

a function of storing the learning model created by executing the program recorded in the computer readable medium according to claim 18, a function of receiving a request signal for lifetime prediction processing of a replaceable component scheduled to be replaced in the laser device, a function of acquiring, in accordance with reception of the request signal, current lifetime-related information related to the replaceable component scheduled to be replaced, a function of calculating lifetime and remaining lifetime of the replaceable component scheduled to be replaced based on the learning model and the current lifetime-related information of the replaceable component scheduled to be replaced, and a function of notifying an external apparatus of information of the lifetime and the remaining lifetime of the replaceable component scheduled to be replaced obtained by the calculating.

* * * * *